(12) United States Patent (10) Patent No.: US 12,468,490 B2
Saito (45) Date of Patent: Nov. 11, 2025

(54) SERVER AND NON-TRANSITORY COMPUTER-READABLE STORAGE MEDIUM

(71) Applicant: BROTHER KOGYO KABUSHIKI KAISHA, Nagoya (JP)

(72) Inventor: Ken Saito, Tokoname (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 0 days.

(21) Appl. No.: 18/363,112

(22) Filed: Aug. 1, 2023

(65) Prior Publication Data

US 2024/0045624 A1 Feb. 8, 2024

(30) Foreign Application Priority Data

Aug. 4, 2022 (JP) .................................. 2022-124966

(51) Int. Cl.
*G06F 3/12* (2006.01)
*G06F 16/245* (2019.01)
*G06F 21/31* (2013.01)

(52) U.S. Cl.
CPC .......... *G06F 3/1204* (2013.01); *G06F 3/1222* (2013.01); *G06F 3/1235* (2013.01); *G06F 3/1238* (2013.01); *G06F 3/1288* (2013.01); *G06F 16/245* (2019.01); *G06F 21/31* (2013.01)

(58) Field of Classification Search
None
See application file for complete search history.

(56) References Cited

U.S. PATENT DOCUMENTS

2004/0246120 A1 12/2004 Benner et al.
2013/0215455 A1* 8/2013 Armstrong ............ G06F 21/608
358/1.15
2016/0292550 A1 10/2016 Kawai
(Continued)

FOREIGN PATENT DOCUMENTS

JP 2004-280256 A 10/2004
JP 2016-193592 A 11/2016
WO 2011-115987 A2 9/2011

OTHER PUBLICATIONS

Extended European Search Report dated Jan. 17, 2024 from related EP 23 18 7896.8.

*Primary Examiner* — Helen Zong
(74) *Attorney, Agent, or Firm* — Scully, Scott, Murphy & Presser, P.C.

(57) ABSTRACT

A server includes a storage device configured to store information on a plurality of administrators for a first service provided using a registered device and a plurality of pieces of authority information for using the first service in association with each other, a receiving device configured to receive, from a terminal device of a user of the first service in which specific authority information among the plurality of pieces of authority information is stored, information on an unregistered specific device and the specific authority information, and a registering device configured to register information on a specific administrator that is associated with the specific authority information received from the terminal device among the information on the plurality of administrators stored in the storage device and the information on the unregistered specific device in association with each other.

12 Claims, 15 Drawing Sheets

(56) References Cited

U.S. PATENT DOCUMENTS

| | | | |
|---|---|---|---|
| 2017/0187924 A1* | 6/2017 | Yasui | G06F 3/0346 |
| 2022/0057973 A1* | 2/2022 | Saito | G06Q 10/087 |
| 2023/0070478 A1* | 3/2023 | Okamoto | G06F 3/1224 |
| 2023/0205403 A1* | 6/2023 | Tao | G06F 3/1204 715/753 |
| 2023/0342096 A1* | 10/2023 | Han | G06F 21/44 |

* cited by examiner

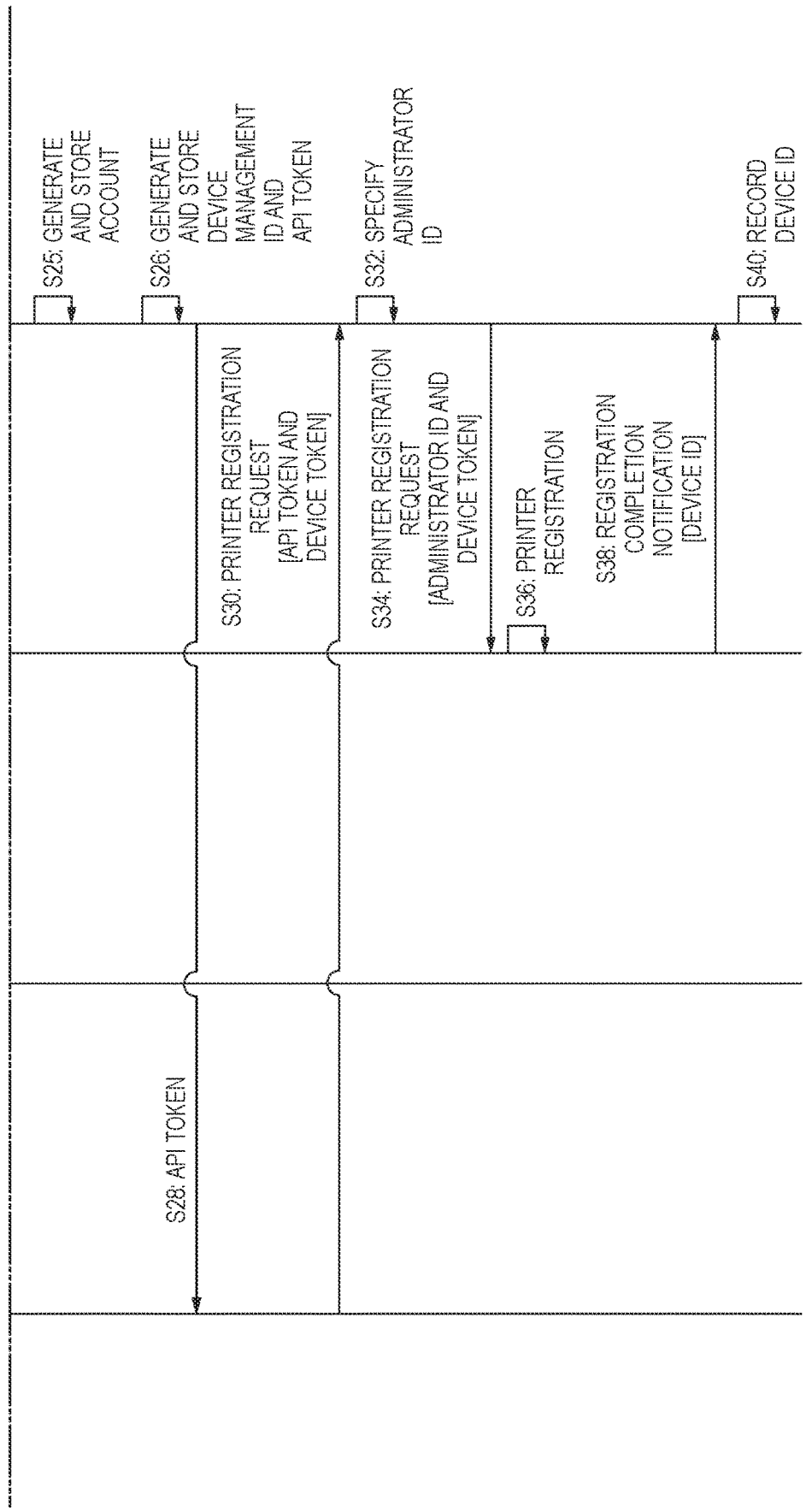

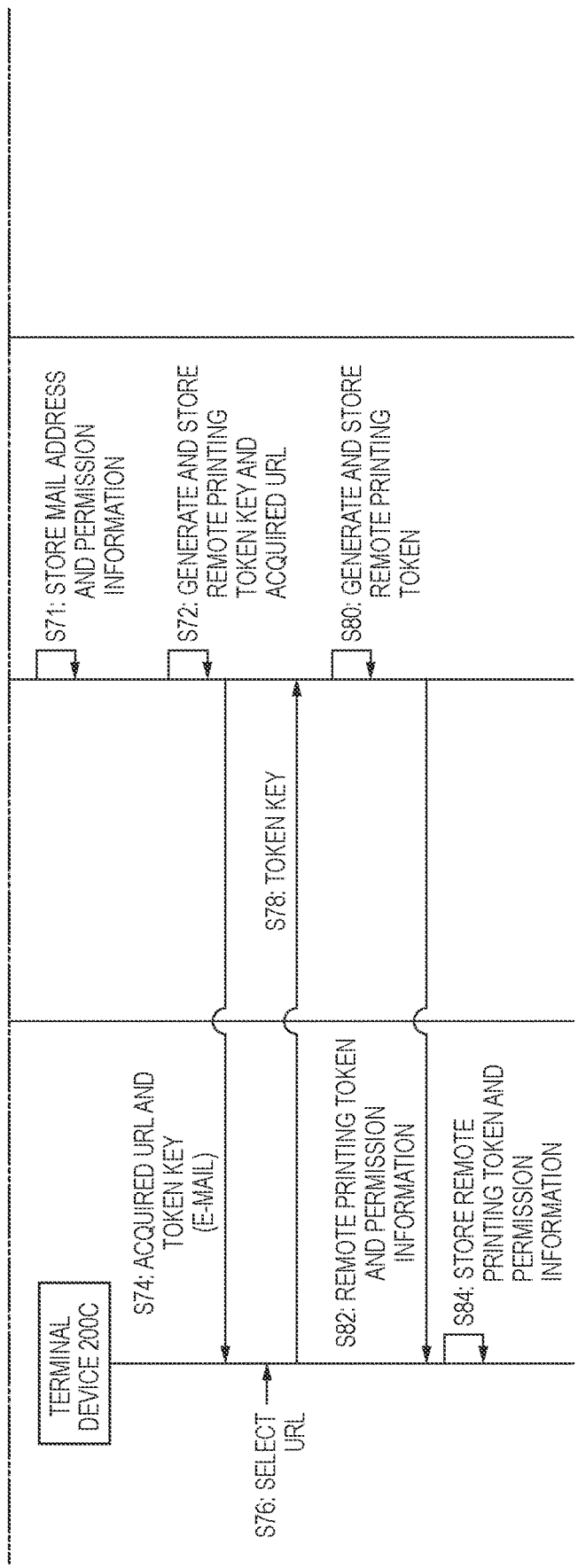

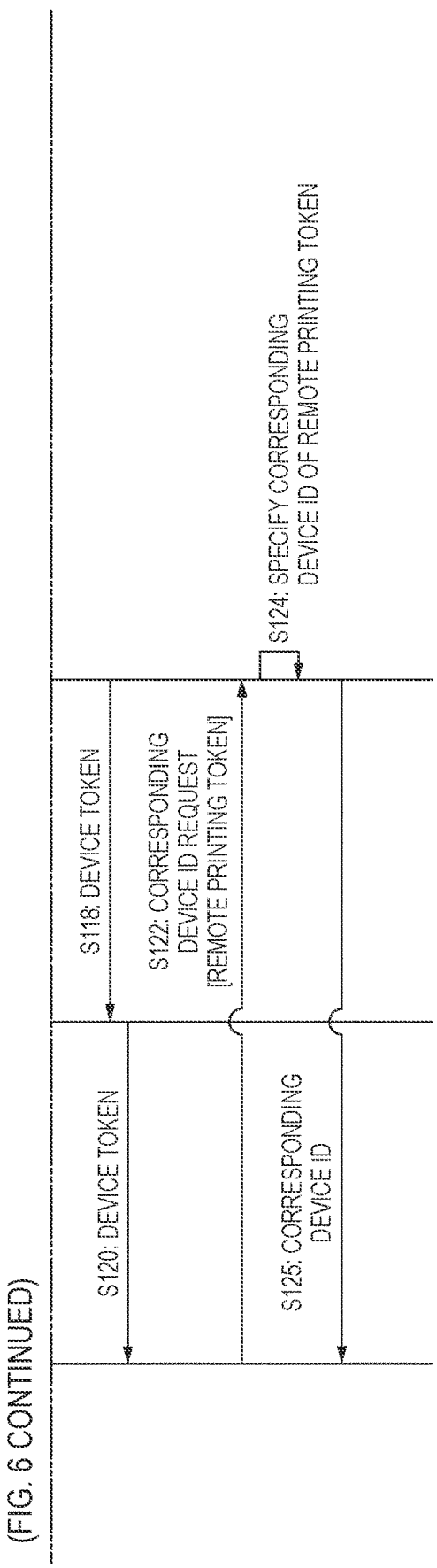

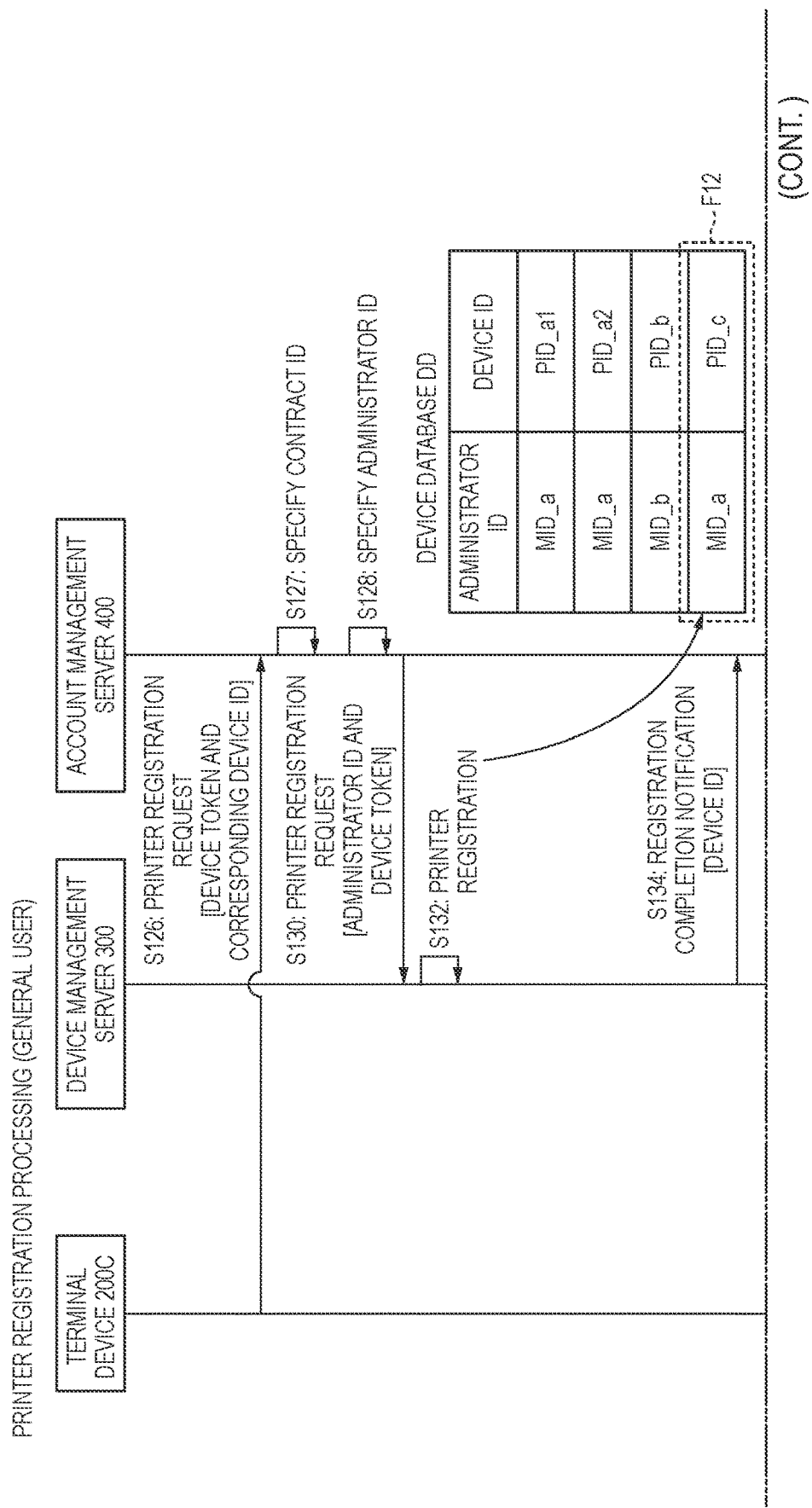

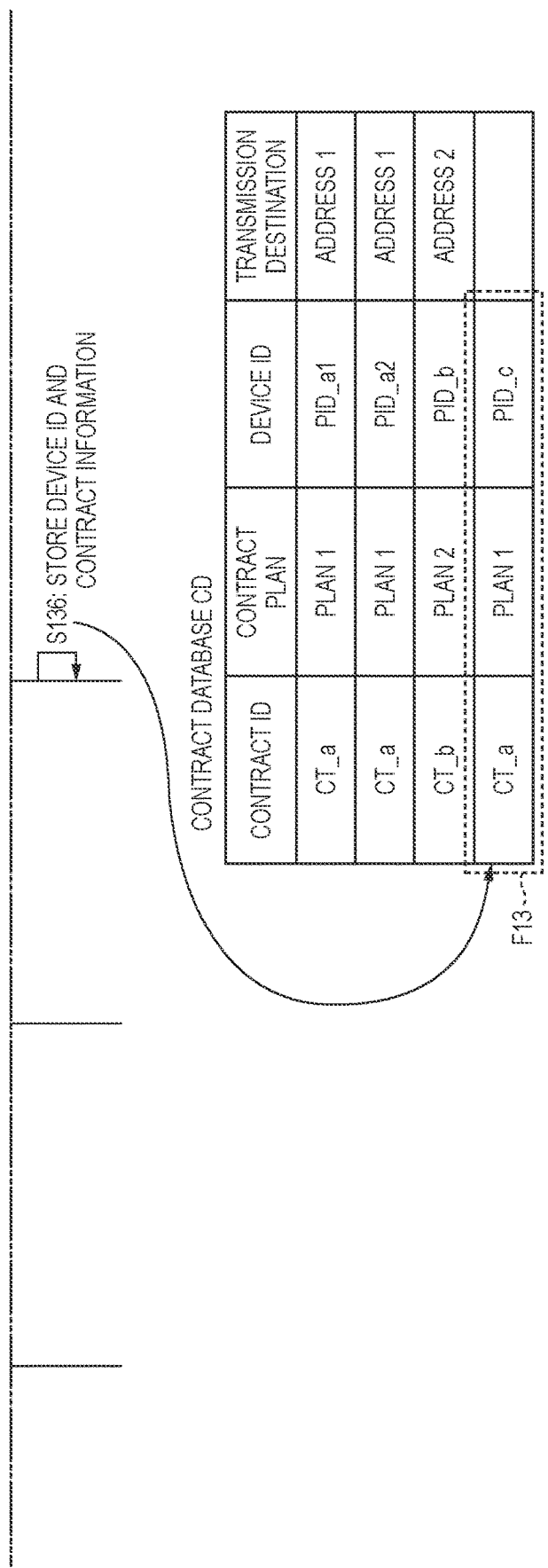
(FIG. 7 CONTINUED)

SERVER AND NON-TRANSITORY COMPUTER-READABLE STORAGE MEDIUM

REFERENCE TO RELATED APPLICATIONS

This application claims priority from Japanese Patent Application No. 2022-124966 filed on Aug. 4, 2022. The entire content of the priority application is incorporated herein by reference.

BACKGROUND ART

A communication system according to a related art provides a service of fixed-price printing using a printer. In the communication system, an information management server issues a PIN code associated with an account and transmits the PIN code to a PC of a user. The user inputs the PIN code to the printer, and the printer transmits the input PIN code and printer information to the information management server. The information management server stores an account associated with the PIN code and the printer information in association with each other.

However, it is necessary to input a PIN code to each printer in the above technique, and for example, in a case where the user is an administrator who administrates a large number of printers, there is a possibility that a burden on the administrator becomes excessively large.

Aspects of the present disclosure provides a technique capable of reducing a burden on an administrator for registering a device.

DESCRIPTION

According to an aspect of the present disclosure, a server includes: a storage device configured to store information on a plurality of administrators for a first service provided using a registered device and a plurality of pieces of authority information for using the first service in association with each other; a receiving device configured to receive, from a terminal device of a user of the first service in which specific authority information among the plurality of pieces of authority information is stored, information on an unregistered specific device and the specific authority information; and a registering device configured to register information on a specific administrator that is associated with the specific authority information received from the terminal device among the information on the plurality of administrators stored in the storage device and the information on the unregistered specific device in association with each other.

According to the above configuration, a server receives, from a terminal device of a user of a first service, information on an unregistered specific device and specific authority information for using the first service. Then, the server registers information on a specific administrator that is associated with the specific authority information received from the terminal device with the information on the specific device in association with each other. As a result, the specific device can be registered in association with the specific administrator simply by receiving the specific authority information and the information on the specific device from the terminal device of the user of the first service. Therefore, a burden on the administrator for registering the specific device can be reduced.

The technique in the present disclosure may be implemented in various forms, and for example, may be implemented in a form such as a system including a terminal device, a device, and a server; a terminal device; a method for the system, the server, and the terminal device; a computer program for implementing a function of the system, the server, the terminal device, and the method; or a non-transitory computer-readable storage medium storing the computer program.

FIG. 7 is a second sequence diagram of printer registration processing performed by a general user.

EMBODIMENT

<Configuration of System 1000>

Figure 1:
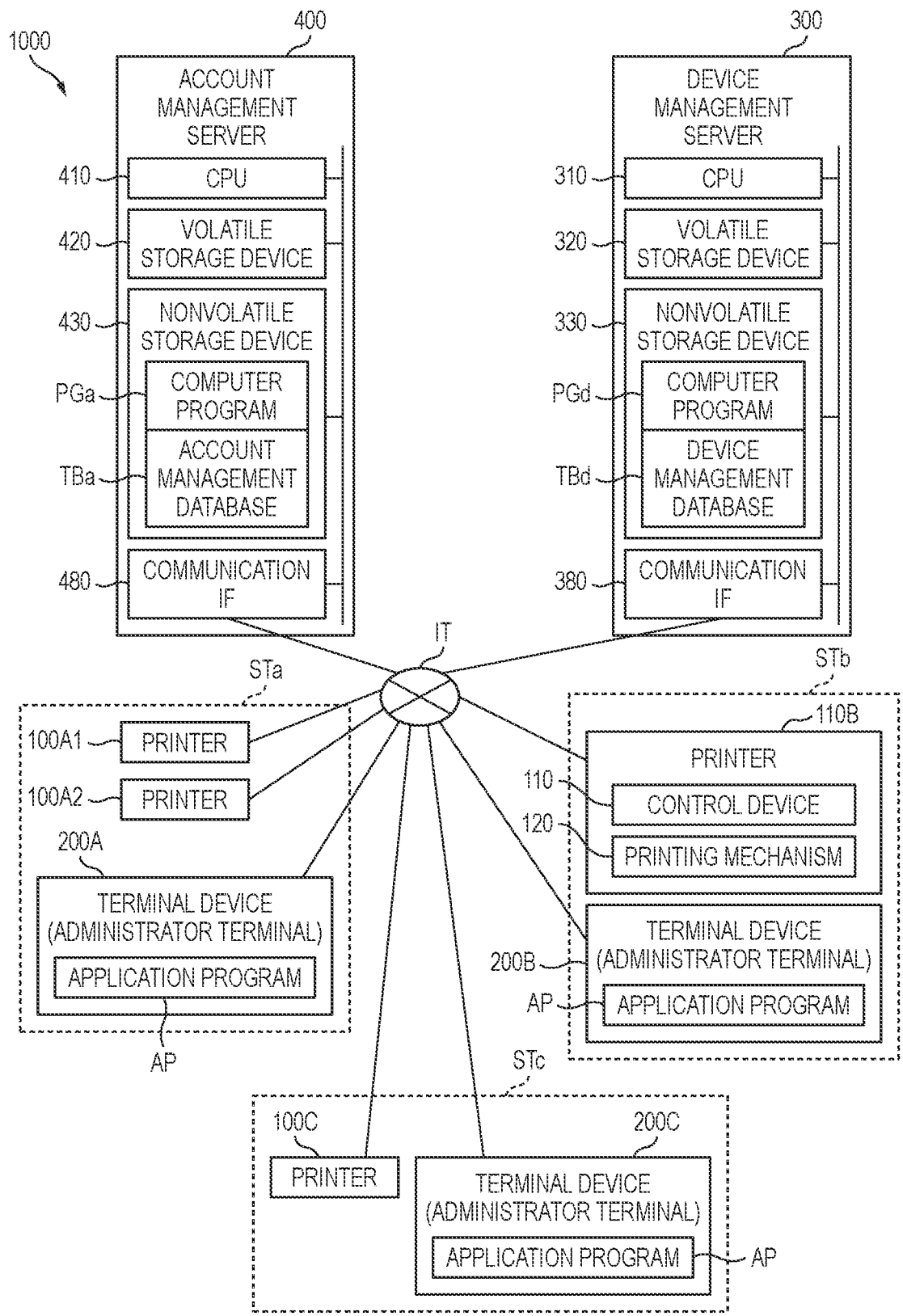
FIG. 1 is a block diagram showing a configuration of a system 1000.

FIG. 1 is a block diagram showing a configuration of a system 1000. The system 1000 includes printers 100A1, 100A2, 100B, and 100C, terminal devices 200A, 200B, and 200C, a device management server 300, and an account management server 400.

The printers 100A1, 100A2, 100B, and 100C are connected to an Internet IT via a local area network (not shown), for example. The terminal devices 200A, 200B, and 200C are connected to the Internet IT via a local area network (not shown) or a mobile communication base station (not shown), for example. The device management server 300 and the account management server 400 are connected to the Internet IT. Accordingly, the terminal devices 200A to 200C, the device management server 300, and the account management server 400 are communicably connected to one another. The printers 100A1, 100A2, 100B, and 100C, the device management server 300, and the account management server 400 are communicably connected to one another.

The printer 100A1 includes a control device 110 and a printing mechanism 120. The printing mechanism executes printing under the control of the control device 110. The printing mechanism 120 is an ink-jet-type printing mechanism that prints an image on a printing medium using a plurality of types of inks (for example, four types of inks of cyan (C), magenta (M), yellow (Y), and black (K)) as color materials. Alternatively, the printing mechanism 120 may be an electrophotographic-type printing mechanism that prints an image on a printing medium using a toner as a color material. The control device 110 includes a CPU (not shown), a memory (not shown), and a communication interface (not shown) for connecting to the local area network, and executes control on the printing mechanism 120 and communication with the device management server 300 and the terminal device 200A as described later. The printers 100A2, 100B, and 100C have configurations 110 and 120 (not shown) similar to those of the printer 100A1.

The terminal devices 200A to 200C are computers, for example, smartphones. In a modified example, the terminal devices 200A to 100C may be personal computers or tablet computers.

The terminal device 200A includes a CPU and a memory as controllers, a display such as a liquid crystal display, and a wireless communication interface (not shown) conforming to the Wi-Fi standard or the mobile communication standard (for example, the LTE standard).

An application program AP is stored in the memory of the terminal device 200A. As will be described later, the application program AP causes the CPU of the terminal device 200A to implement various types of processing related to a service using a printer among the printers 100A1 and 100A2 as well as the servers 300 and 400, for example, in response to an instruction from the user. For example, the application program AP is provided by a business operator who manufactures and sells the printers 100A1, 100A2, 100B, and 100C. The application program AP is provided, for example, in a form of being downloaded from a server connected via the Internet IT. Alternatively, the application program AP may be provided in a form of being pre-installed in the terminal device 200A. The terminal devices 200B and 200C have the same configuration as the terminal device 200A. Hereinafter, a function implemented by the CPUs of the respective terminal devices 200A to 200C by executing the application program AP is also referred to as a "terminal application".

The printers 100A1 and 100A2 are disposed in a site STa. The terminal device 200A is a terminal device (administrator terminal) of a user (hereinafter also referred to as an administrative user A) who is an administrator for the printers 100A1 and 100A2 in the site STa. The site STa is, for example, one department of a specific company. The terminal device 200A as well as the printers 100A1 and 100A2 may communicate with one another via a local area network (not shown) of the site STa.

The printer 100B is disposed in a site STb. The terminal device 200B is a terminal device (administrator terminal) of a user (hereinafter also referred to as an administrative user B) who is an administrator for the printer 100B in the site STb. The site STb is, for example, another department of the specific company. The terminal device 200B and the printer 100B may communicate with each other via a local area network (not shown) of the site STb.

The printer 100C is disposed in a site STc. The terminal device 200C is a terminal device (user terminal) of an owner (hereinafter also referred to as a general user C) of the printer 100C in the site STc. The site STc is, for example, the home of the general user C. The general user C is, for example, an employee of the specific company. The terminal device 200C and the printer 100C may communicate with each other via a local area network (not shown) of the site STc.

The device management server 300 and the account management server 400 are, for example, computers, for example, cloud servers, operated by a business operator who manufactures and sells the printers 100A1, 100A2, 100B, and 100C. These servers cooperate with one another to execute processing related to a service using a printer to be described later.

The device management server 300 includes a CPU 310 as a controller, a volatile storage device 320 such as a DRAM, a nonvolatile storage device 330 such as a hard disk or a flash memory, and a communication interface (IF) 380.

The communication IF 380 is, for example, a wired interface conforming to Ethernet (registered trademark).

The CPU 310 is an arithmetic device (processor) that performs data processing. The volatile storage device 320 provides a buffer region in which various types of intermediate data generated when the CPU 310 performs processing are temporarily stored. The nonvolatile storage device 330 stores a computer program PGd and a device management database TBd to be described later.

Similarly to the device management server 300, the account management server 400 includes a CPU 410 as a controller, a volatile storage device 420, and a communication IF 480. The volatile storage device 420 provides a buffer region in which various types of intermediate data generated when the CPU 410 performs processing are temporarily stored. The nonvolatile storage device 430 stores a computer program PGa and an account management database TBa to be described later.

The computer programs PGd and PGa of the servers are provided, for example, in a form of being uploaded by a business operator who manufactures or sells the printers 100A1, 100A2, 100B, and 100C. The CPUs of the servers 300 and 400 execute the computer programs PGd and PGa, respectively, thereby executing processing related to a service using a printer, which will be described later. For example, the device management server 300 mainly manages information related to a printer to be managed and provides a remote printing service and a consumable management service to be described later. The account management server 400 mainly manages information related to a user (account information, contract information, and the like to be described later).

The servers 300 and 400 are communicably connected to each other via the Internet IT. It can be said that the entirety of the servers 300 and 400 are one server for providing a service related to a printer.

The device management servers 300 and 400 provide a consumable management service and a remote printing service as services related to a printer. The consumable management service is, for example, a service in which a remaining amount of a consumable of a printer such as ink is managed and the consumable is delivered to a user in accordance with consumption of the consumable. The remote printing service is, for example, a service in which a print job is generated using an image file transmitted from a terminal device of a user and then is transmitted to the printer, thereby causing a printer to perform printing. In other words, the consumable management service is an example of a subscription-type service for periodically supplying the consumable, and is an example of a service in which a contract occurs between a business operator and a user with the use of the service. The remote printing service is an example of a security service for determining a device operation authority by an external device, and is an example of a device management service that may be used in association with a purchased device even without a new contract or the like between a business operator and a user.

Figure 2:
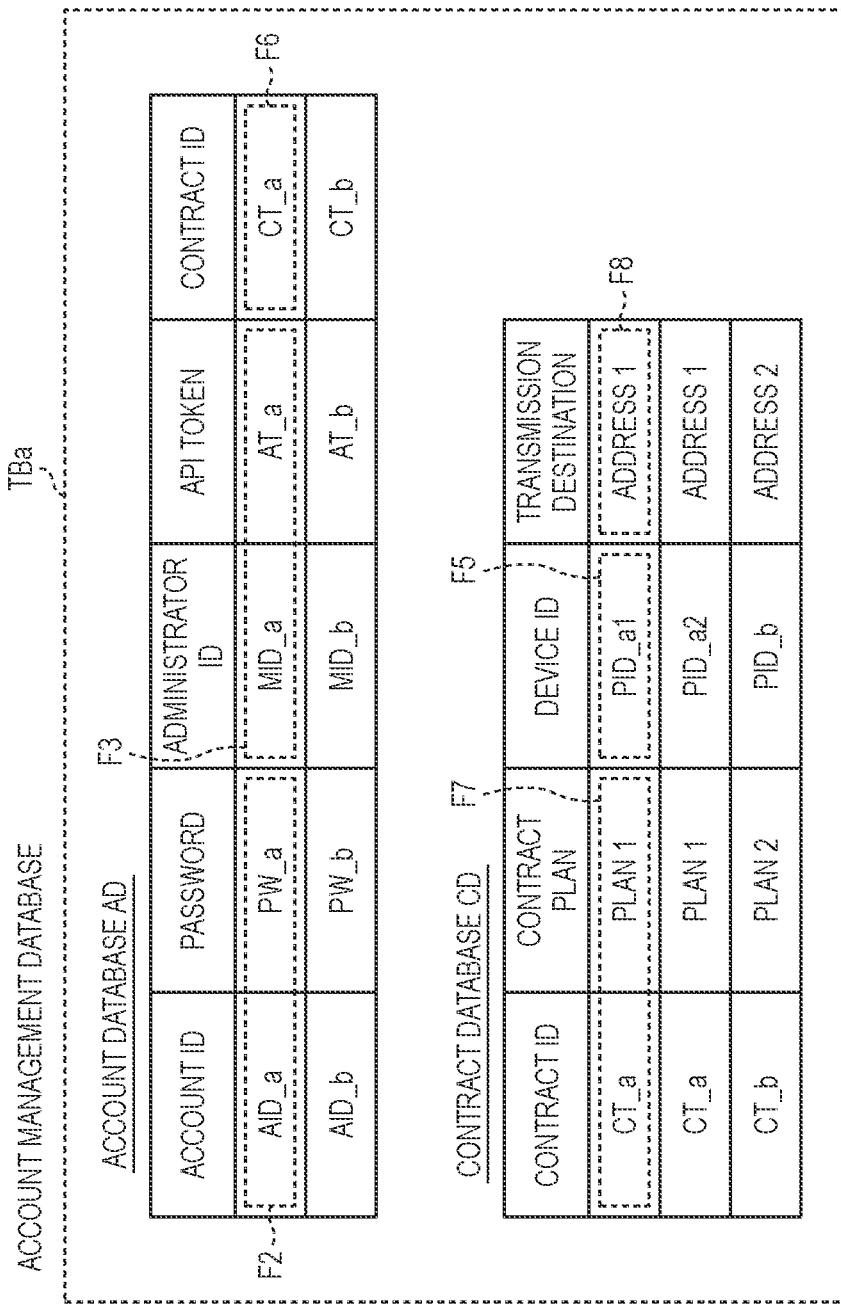
FIG. 2 is a diagram showing an example of an account management database TBa.
Figure 3:
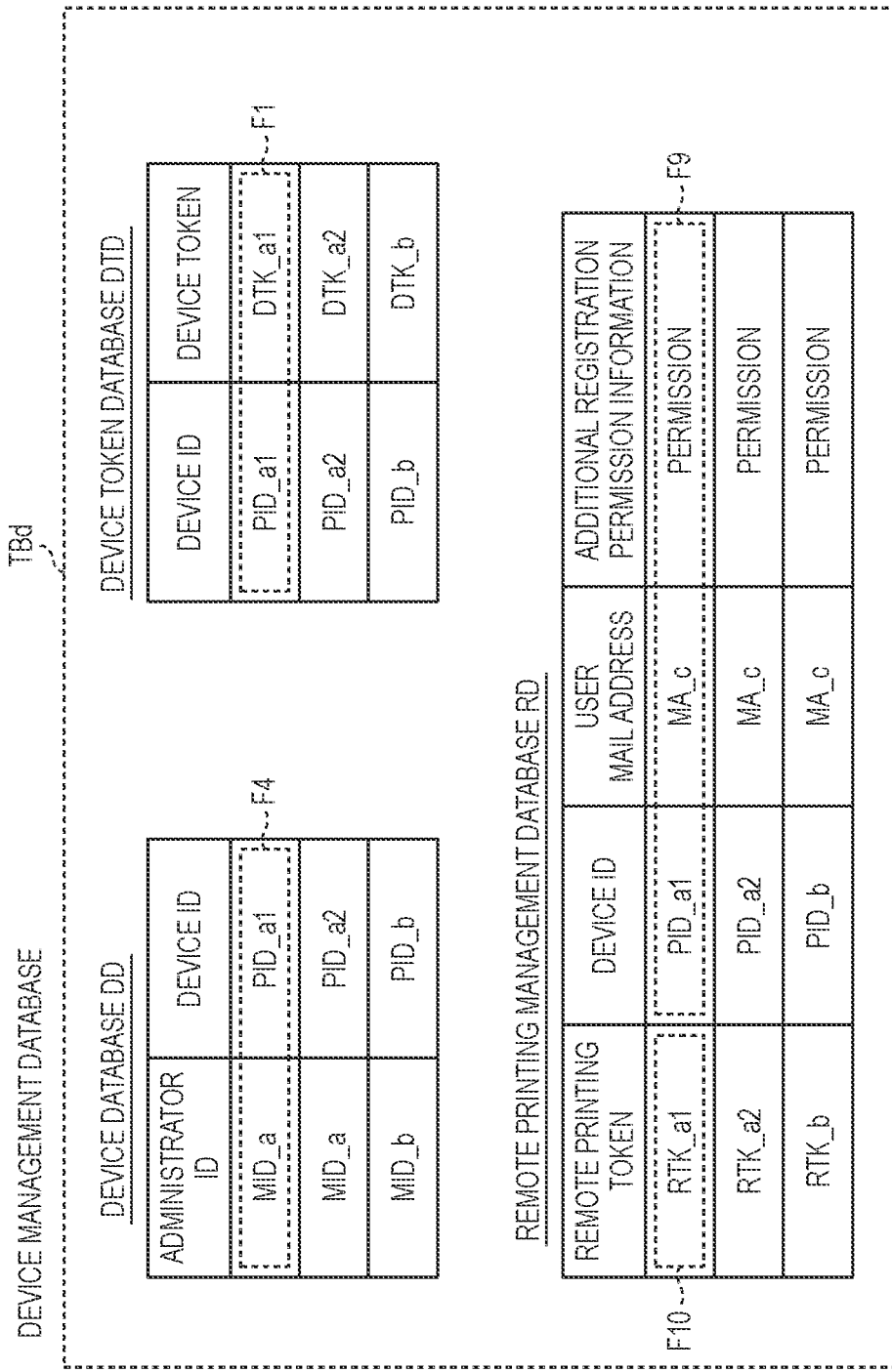
FIG. 3 is a diagram showing an example of a device management database TBd.

In the device management database TBd and the account management database TBa of the respective device management servers 300 and 400, information necessary for providing these services is recorded. FIG. 2 is a diagram showing an example of the account management database TBa. FIG. 3 is a diagram showing an example of the device management database TBd. In the databases TBa and TBb in FIGS. 2 and 3, three printers 100A1, 100A2, and 100B are registered as printers that can be used for a service. In the databases TBa and TBb in FIGS. 2 and 3, necessary information is registered in the following predetermined registration state. The predetermined registration state is a state in which the three printers 100A1, 100A2, and 100B are registered as printers to be subjected to the consumable management service, and the general user C is registered such that an owner of the terminal device 200C may use the remote printing service using the three printers 100A1, 100A2, and 100B.

As shown in FIG. 2, the account management database TBa includes an account database AD and a contract database CD.

The account database AD is a database in which an account of an administrative user and information associated with the account are registered. Specifically, account information is recorded in the account database AD for each administrative user. In the present embodiment, the account information includes an account ID and a password. In the example of FIG. 2, an account ID "AID_a" and a password "PW_a" of the administrative user A as well as an account ID "AID_b" and a password "PW_b" of the administrative user B are recorded.

In the account database AD, an administrator ID, an API token, and a contract ID are recorded in association with the account information. The administrator ID is identification information on the administrative user, and is used in the device management server 300 to register and manage the printer for each administrative user (that is, for each account). The API token is stored in a terminal device (for example, the terminal device 200A or 200B) of an administrative user, and is used as authority information for the terminal device to access the account management server 400. The contract ID is identification information on a contract of the consumable management service. The contract of the consumable management service is made between the business operator operating the device management servers 300 and 400 and the administrative user. The contract ID is assigned to each administrative user who makes a contract. In the example of FIG. 2, an administrator ID "MID_a", an API token "AT_a", and a contract ID "CT_a" are recorded in association with the account of the administrative user A, and an administrator ID "MID_b", an API token "AT_b", and a contract ID "CT_b" are recorded in association with the account of the administrative user B.

The contract database CD is a database in which information related to the contract of the consumable management service is registered. Specifically, in the contract database CD, a contract plan, a device ID of the printer to be subjected to the consumable management service based on the contract, and a transmission destination of the consumable (specifically, ink) are associated with the contract ID. In the example of FIG. 2, a contract plan "plan 1", device IDs "PID_a1" and "PID_a2" of the respective printers 100A1 and 100A2, and a transmission destination "address 1" are recorded in association with the contract ID "CT_a" of the contract with the administrative user A. A device ID "PID_b" of the printer 100B, a contract plan "plan 2", and a transmission destination "address 2" are recorded in association with the contract ID "CT_b" of the contract with the administrative user B. It is considered that in the contract plan, for example, the assumed replacement frequency of the consumable is different between "plan 1" and "plan 2", and a contract having a different monthly cost is set according to the degree of the replacement frequency.

[As shown in FIG. 3, the device management database TBd includes a device database DD, a device token database DTD, and a remote printing management database RD.

The device database DD is a database in which a printer to be managed is registered for each administrative user. Specifically, in the device database DD, the above-described administrator ID and the device ID of the printer to be managed are recorded in association with each other. In the example of FIG. 3, the device IDs "PID_a1" and "PID_a2" of the two respective printers 100A1 and 100A2 are recorded in association with the administrator ID "MID_a" that is associated with the account of the administrative user A. Further, the device ID "PID_b" of the printer 100B is recorded in association with the administrator ID "MID_b" that is associated with the account of the administrative user B.

The device token database DTD is a database in which a device token is registered for each printer to be managed. The device token is stored in the printer and is used as authority information for the printer to access the device management server 300. Specifically, in the device token database DTD, the device token is recorded in association with the device ID of the printer to be managed. In the example of FIG. 3, device tokens "DTK_a1", "DTK_a2", and "DTK_b" are recorded in association with the device IDs "PID_a1", "PID_a2", and "PID_b" of the printers 100A1, 100A2, and 100B, respectively.

The remote printing management database RD is a database in which information related to the remote printing service is recorded. Specifically, in the remote printing management database RD, a remote printing token is recorded in association with the device ID of the printer used for the remote printing service. The remote printing token is stored in the terminal device of the user of the remote printing (terminal device 200C of general user C in the present embodiment), and is used as authority information for the terminal device to designate a printer and transmit a printing instruction to the device management server 300. That is, the remote printing token is information indicating an authority to cause a printer associated with the remote printing token to execute printing processing. In the example of FIG. 3, three remote printing tokens "RTK_a1", "RTK_a2", and "RTK_b" are recorded in association with the device IDs "PID_a1", "PID_a2", and "PID_b" of the printers 100A1, 100A2, and 100B, respectively.

In the remote printing management database RD, a user mail address and additional registration permission information are recorded in association with each remote printing token. The user mail address is a mail address of a user of the remote printing service. The additional registration permission information is information indicating whether additional registration of a printer by a user of the remote printing service is permitted, as described in detail later. In other words, it can be said that the additional registration permission information is information indicating whether addition of a new device used for providing the consumable management service using a remote printing token for another printer is permitted. In the example of FIG. 3, a mail address "MA_c" of the general user C and additional registration permission information indicating "permission" are recorded in each of the three remote printing tokens "RTK_a1", "RTK_a2", and "RTK_b".

<Printer Registration Processing by Administrative User>

Figure 4:
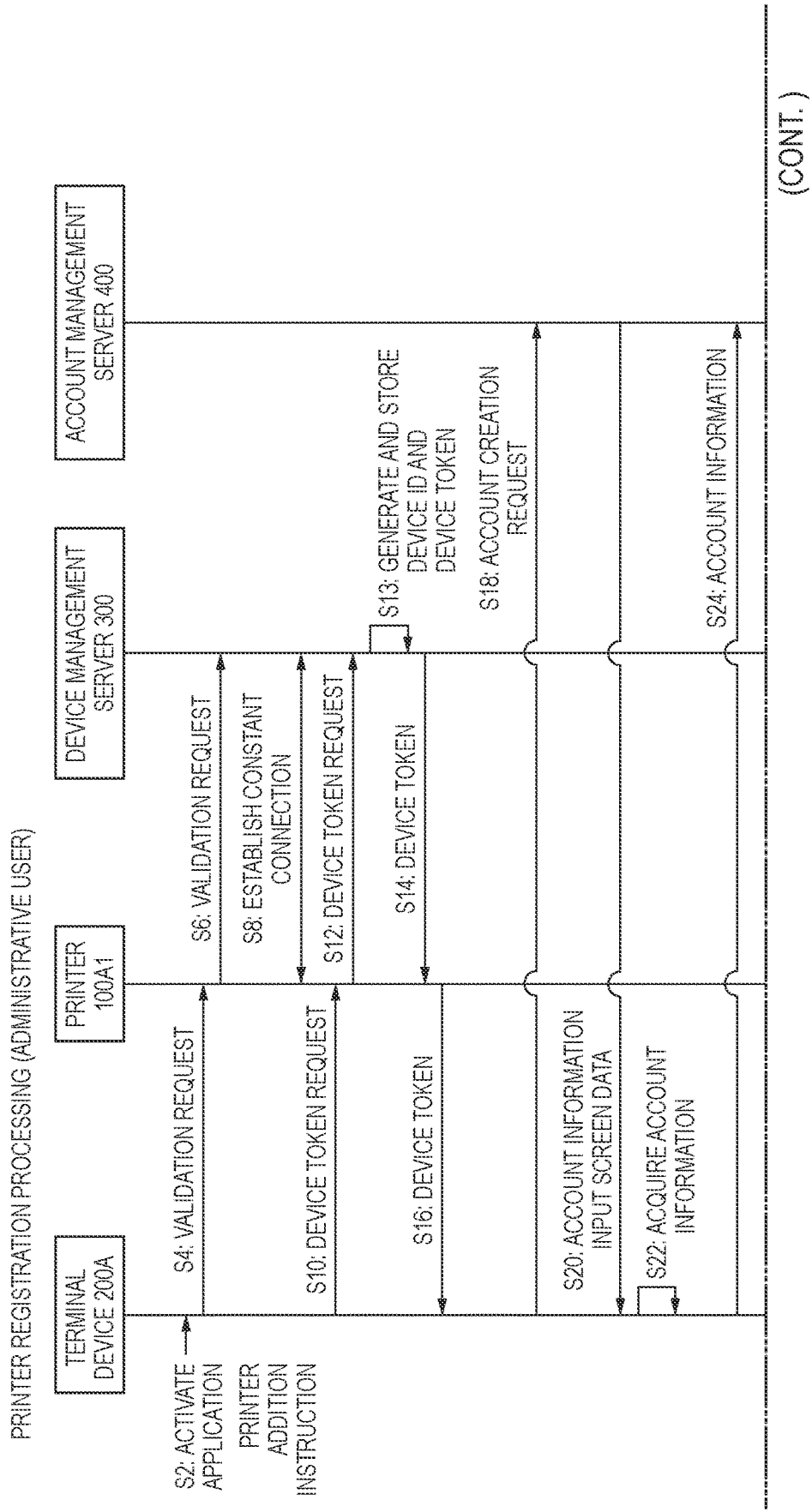
FIG. 4 is a sequence diagram of printer registration processing by an administrative user.

Processing in which an administrative user registers a printer used for the remote printing service and the consumable management service in the device management server 300 and the account management server 400, respectively, will be described. FIG. 4 is a sequence diagram of printer registration processing by an administrative user. FIG. 4 shows an example of a case where the administrative user A first registers the printer 100A1.

In S2, the administrative user A activates a terminal application in the terminal device 200A, designates the printer 100A1 to the terminal application, and inputs a printer addition instruction. For example, the administrative user A inputs an IP address of the printer 100A1 on an input screen (not shown) and presses a printer addition instruction button.

In S4, the terminal application of the terminal device 200A transmits, to the printer 100A1, a validation request for a service using the printer 100A1 in response to the printer addition instruction. The validation request is transmitted, for example, to the input IP address as a destination.

Upon receiving the validation request from the terminal device 200A, the printer 100A1 transmits the validation request to the device management server 300 in S6. In the present embodiment, the manufacturer of the printer 100A1 and the operator of the device management server 300 are the same business operator, and information (for example, an IP address) for communicating with the device management server 300 is stored in the printer 100A1 in advance.

Upon receiving the validation request from the printer 100A1, the device management server 300 establishes a constant connection with the printer 100A1 in S8. The constant connection is, for example, a connection according to Extensible Messaging and Presence Protocol (XMPP). Accordingly, the device management server 300 and the printer 100A1 can perform communication related to the service using the printer 100A1 at any timing.

In S10, the terminal application of the terminal device 200A transmits a device token request to the printer 100A1. Upon receiving the device token request, the printer 100A1 transmits the device token request to the device management server 300 in S12. Upon receiving the device token request, the device management server 300 generates the device ID "PID_a" and the device token "DTK_a1" to be assigned to the printer 100A1 and stores the device ID "PID_a" and the device token "DTK_a1" in the device token database DTD in S13. Accordingly, the device ID "PID_a" and the device token "DTK_a1" are recorded in the device token database DTD in association with each other, as indicated by a broken-line frame F1 in FIG. 3.

In S14, the device management server 300 transmits the generated device token "DTK_a1" to the printer 100A1. Upon receiving the device token "DTK_a1", the printer 100A1 may access the device management server 300 using the device token "DTK_a1" thereafter. In S16, the printer 100A1 transmits the received device token "DTK_a1" to the terminal device 200A.

Upon receiving the device token "DTK_a1", the terminal application of the terminal device 200A transmits an account creation request to the account management server 400 in S18. In the present embodiment, the provider of the terminal application and the operator of the account management server 400 are the same business operator, and information (for example, an IP address or a URL) for communicating with the account management server 400 is incorporated in the terminal application in advance.

Upon receiving the account creation request, the account management server 400 transmits screen data indicating an account information input screen to the terminal device 200A in S20.

Upon receiving the account information input screen data, the terminal application of the terminal device 200A acquires the account information from the administrative user A in S22. Specifically, the terminal application displays the account information input screen on the display of the terminal device 200A according to the account information input screen data. Although not shown, the account information input screen includes, for example, an input field for inputting an account ID and a password. The terminal application acquires the account ID "AID_a" and the password "PW_a" input in the input field by the administrative user A as account information.

In S24, the terminal application of the terminal device 200A transmits the acquired account information to the account management server 400. Upon receiving the account information, the account management server 400 generates an account of the administrative user A based on the account information and stores the account in the account database AD in S25. Accordingly, the account ID "AID_a" and the password "PW_a" of the administrative user A are recorded in the account database AD in association with each other, as indicated by a broken-line frame F2 in FIG. 2.

In S26, the account management server 400 generates the administrator ID "MID_a" and the API token "AT_a" to be associated with the account of the administrative user A, and stores the administrator ID "MID_a" and the API token "AT_a" in the account database AD. Accordingly, the administrator ID "MID_a" and the API token "AT_a" are recorded in the account database AD in association with the account information ("AID_a" and "PW_a") of the administrative user A, as indicated by a broken-line frame F3 in FIG. 2.

In S28, the account management server 400 transmits the generated API token "AT_a" to the terminal device 200A. Thereafter, the terminal application of the terminal device 200A can designate the account of the administrative user A using the API token "AT_a" and access the account management server 400.

In S30, the terminal application of the terminal device 200A transmits a printer registration request to the account management server 400. The printer registration request includes the API token "AT_a" received in S28 and the device token "DTK_a1" received in S16.

Upon receiving the printer registration request, the account management server 400 searches the account database AD to specify the administrator ID "MID_a" that is associated with the API token "AT_a" included in the printer registration request in S32.

In S34, the account management server 400 transmits a printer registration request to the device management server 300. The printer registration request includes the administrator ID "MID_a" specified in S32 and the device token "DTK_a1" received in S30.

Upon receiving the printer registration request, the device management server 300 registers the printer 100A1 in the device database DD. Specifically, the device management server 300 searches the device token database DTD to specify the device ID "PID_a1" (device ID of printer 100A1) that is associated with the device token "DTK_a1" included in the printer registration request. The device management server 300 records the specified device ID "PID_a1" in the device database DD in association with the administrator ID "MID_a" included in the printer registration request. Accordingly, the device ID "PID_a1" of the printer 100A1 and the administrator ID "MID_a" associated with the account of the administrative user A are recorded in the device database DD in association with each other, as indicated by a broken-line frame F4 in FIG. 3.

In S38, the device management server 300 transmits a registration completion notification to the account management server 400. The registration completion notification includes the device ID "PID_a1" of the registered printer 100A1 (device ID newly recorded in device database DD).

Upon receiving the registration completion notification, the account management server 400 records the device ID "PID_a1" included in the registration completion notification in the contract database CD in S40. Accordingly, the device ID "PID_a1" of the printer 100A1 is recorded in the contract database CD, as indicated by a broken-line frame F5 in FIG. 2.

By the above processing, the printer 100A1 is registered as the printer of the administrative user A to be newly used for the service. Thereafter, for example, in a case where the administrative user A inputs information (contract plan and transmission destination) related to the contract of the consumable management service on a contract screen (not shown) displayed on the terminal application, the information is transmitted to the account management server 400. The account management server 400 generates the contract ID to be assigned to the administrative user A, and records the contract ID and the information related to the contract in the account database AD and the contract database CD, as indicated by broken-line frames F6, F7, and F8 in FIG. 2.

Accordingly, the consumable management service is started for the printer 100A1. For example, the printer 100A1 periodically accesses the device management server 300 using the device token "DTK_a1" received in S14, and transmits remaining amount information of the color material (ink in the present embodiment) of the printer 100A1 to the device management server 300. The device management server 300 monitors the remaining amount of ink of the printer 100A1 by storing the remaining amount information in association with the device ID "PID_a1" that is associated with the device token "DTK_a1", for example. For example, in a case where the remaining amount of ink of the printer 100A1 becomes equal to or less than a threshold, the device management server 300 notifies the account management server 400 of the fact. The account management server 400 executes delivery processing of delivering the ink that is equal to or less than the threshold to the transmission destination (address 1) stored in the contract database CD.

The printer registration processing similar to that in FIG. 4 is also executed for the printer 100A2, such that the printer 100A2 is registered as the printer of the administrative user A. However, at the time of the registration processing of the printer 100A2, the account of the administrative user A is already created, and the API token "AT_a" is stored in the terminal device 200A, and thus S18 to S28 in FIG. 4 are not executed.

Further, the printer registration processing similar to that in FIG. 4 is also executed for the printer 100B, such that the printer 100B is registered as the printer of the administrative user B. However, at the time of the registration processing of the printer 100B, the processing of the terminal device 200A of the administrative user A in FIG. 4 is executed by the terminal device 200B of the administrative user B.

By the above processing, the printers 100A1, 100A2, and 100B are registered in the servers 300 and 400, and the consumable management service for the printers 100A1, 100A2, and 100B may be provided. In this state, all the information shown in FIG. 2 is recorded in the account management database TBa. All the information shown in FIG. 3 is recorded in the device database DD and the device token database DTD of the device management database TBd.

<Remote Printing Registration Processing>

Figure 5:
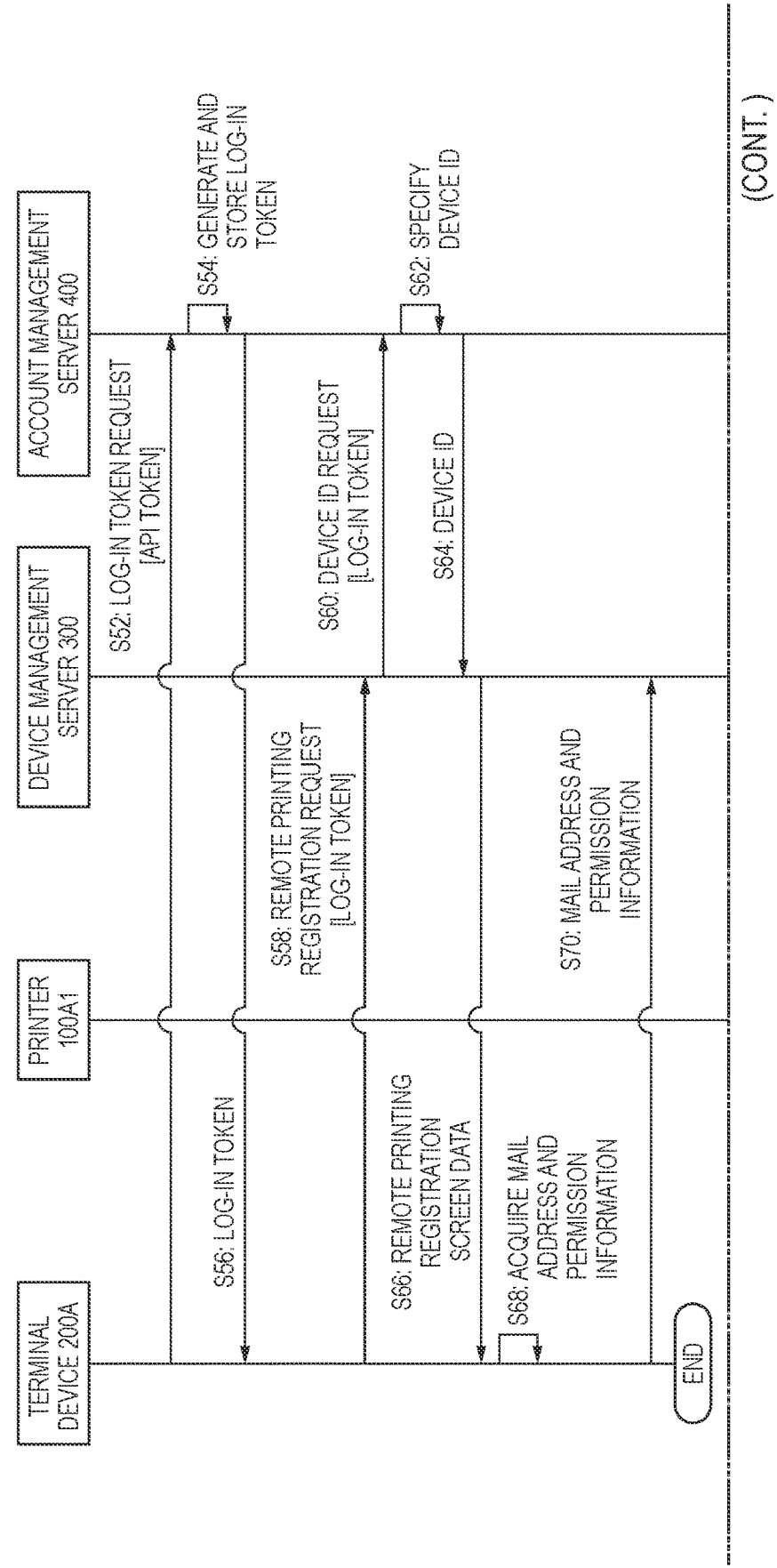
FIG. 5 is a sequence diagram of remote printing registration processing.

In the processing of FIG. 4, remote printing registration processing is executed after the printer to be managed is registered. The remote printing registration processing is processing of registering a remote printing token in the device management server 300 such that a general user may use the remote printing service using the printer registered in the processing of FIG. 4. FIG. 5 is a sequence diagram of the remote printing registration processing. FIG. 5 shows an example in which the remote printing service using the printer 100A1 managed by the administrative user A is set such that the general user C may use the terminal device 200C.

In S52 subsequent to the processing of FIG. 4, the terminal application of the terminal device 200A transmits a log-in token request to the account management server 400. The log-in token is a token that is temporarily used for setting the remote printing service for the printer 100A1 registered in the processing of FIG. 4. The log-in token request includes the API token "AT_a" received in S28 of FIG. 4.

Upon receiving the log-in token request, the account management server 400 generates a log-in token and temporarily stores the log-in token in the volatile storage device 420 in association with the device ID "PID_a" of the printer 100A1 received in S38 of FIG. 4 in S54. The log-in token is temporarily used and deleted after the remote printing setting processing. Therefore, a table for temporarily storing the log-in token is not shown.

In S56, the account management server 400 transmits the generated log-in token to the terminal device 200A. Upon receiving the log-in token, the terminal application of the terminal device 200A transmits the remote printing registration request to the device management server 300 in S58. The remote printing registration request includes the received log-in token.

Upon receiving the printer registration request, the device management server 300 transmits a device ID request to the account management server 400 in S60. The device ID request includes the log-in token received from the terminal device 200A.

Upon receiving the device ID request, the account management server 400 specifies the device ID (device ID "PID_a1" of printer 100A1 in the example of FIG. 5) stored in association with the log-in token included in the device ID request in S62. In S64, the account management server 400 transmits the device ID "PID_a1" of the specified printer 100A1 to the device management server 300.

Upon receiving the device ID "PID_a1", the device management server 300 transmits screen data indicating a remote printing registration screen to the terminal device 200A in S66.

Upon receiving the remote printing registration screen data, the terminal application of the terminal device 200A acquires the mail address and the additional registration permission information from the administrative user A in S68. Specifically, the terminal application displays the remote printing registration screen on the display of the terminal device 200A according to the remote printing registration screen data. Although not shown, the remote printing registration screen includes, for example, an input field for inputting the mail address and the additional registration permission information. The mail address is a mail address of a user of the remote printing service using the printer 100A1. As described above, the additional registration permission information is information indicating whether additional registration of a printer by a user (general user C in the example of FIG. 5) of the remote printing service is permitted. In the example of FIG. 5, the mail address "MA_c" of the general user C and additional registration permission information indicating "permission" are acquired. In S70, the terminal application of the terminal device 200A transmits the acquired mail address "MA_c" and the additional registration permission information to the device management server 300.

Upon receiving the mail address and the additional registration permission information, the device management server 300 stores the received mail address and additional registration permission information in S71. Specifically, the device management server 300 records the mail address "MA_c" and the additional registration permission information indicating "permission" in the remote printing management database RD in association with the device ID "PID_a1" of the printer 100A1 received in S64, as indicated by a broken-line frame F9 in FIG. 3.

In S72, the device management server 300 generates a remote printing token key and an acquired URL, and temporarily stores the remote printing token key and the acquired URL in the volatile storage device 320 in association with the device ID "PID_a1" of the printer 100A1. The remote printing token key is, for example, data used for generation of a remote printing token "RTK_a1". As described later, the acquired URL is a uniform resource locator (URL) used by the general user C to acquire the remote printing token "RTK_a1". In the present embodiment, the acquired URL is associated with the application program AP (terminal application), and in a case where the acquired URL is selected in a terminal device (for example, the terminal device 200C) in which the application program AP is stored as described later, the terminal application is activated. The remote printing token key and the acquired URL may be associated with each other in a form in which the remote printing token key is included in a character string constituting the acquired URL.

In S74, the device management server 300 transmits the acquired URL and the remote printing token key by e-mail addressed to the mail address "MA_c" of the general user C. Accordingly, the acquired URL and the remote printing token key are transmitted to the terminal device 200C of the general user C.

In a case where the acquired URL and the remote printing token key are transmitted to the terminal device 200C by e-mail, the general user C views the e-mail on the terminal device 200C and selects the acquired URL included in the e-mail in S76. In a case where the acquired URL is selected, the terminal application is activated in the terminal device 200C. In S78, the terminal application of the terminal device 200C transmits the received remote printing token key to the device management server 300.

Upon receiving the remote printing token key, the device management server 300 generates the remote printing token "RTK_a1" using the remote printing token key, and stores the remote printing token "RTK_a1". Specifically, the device management server 300 records the remote printing token "RTK_a1" in the remote printing management database RD in association with the device ID "PID_a1" of the printer 100A1 that is associated with the remote printing token key, as indicated by a broken-line frame F10 in FIG. 3. In S82, the device management server 300 transmits the generated remote printing token "RTK_a1" and the additional registration permission information associated with the remote printing token "RTK_a1" in the remote printing management database RD to the terminal device 200C.

Upon receiving the remote printing token "RTK_a1" and the additional registration permission information, the terminal application of the terminal device 200C stores the remote printing token "RTK_a1" and the additional registration permission information in the memory of the terminal device 200C in association with each other in S84.

Accordingly, the general user C may use the remote printing service using the printer 100A1. For example, the general user C activates a terminal application on the terminal device 200C, designates an image file indicating an image to be printed via a print instruction input screen (not shown) of the terminal application, and inputs a print instruction. Upon receiving the print instruction, the terminal application of the terminal device 200C transmits a print request to the device management server 300. The print request includes the designated image file and the remote printing token "RTK_a1" acquired in the remote printing registration processing in FIG. 5. Upon receiving the print request, the device management server 300 checks whether the remote printing token "RTK_a1" is recorded in the remote printing management database RD. In a case where the remote printing token "RTK_a1" is recorded, the device management server 300 acquires the device ID "PID_a1" associated with the remote printing token "RTK_a1" in the remote printing management database RD, thereby specifying the printer 100A1 as the transmission destination of the print job. The device management server 300 generates a print job using the image file included in the print request. Specifically, rasterizing processing, color conversion processing, and halftone processing are performed on the image data included in the image file, thereby generating print data. A print job including the print data and print control data indicating print settings and the like is generated. The device management server 300 transmits the print job to the printer 100A1. The print job is transmitted using a constant connection established between the device management server 300 and the printer 100A1. Upon receiving the print job, the printer 100A1 executes printing based on the print job. Accordingly, the image indicated by the image file designated by the general user C is printed by the printer 100A1.

The remote printing registration processing similar to that in FIG. 5 is also executed for the printer 100A2, such that the general user C may also use the remote printing service using the printer 100A2.

Further, the remote printing registration processing similar to that in FIG. 5 is also executed for the printer 100B, such that the general user C may also use the remote printing service using the printer 100B. However, at the time of the remote printing registration processing for the printer 100B, the processing of the terminal device 200A of the administrative user A in FIG. 5 is executed by the terminal device 200B of the administrative user B.

In a state where the general user C may use the remote printing service using the printers 100A1, 100A2, and 100B, all of the information shown in FIG. 3 is recorded in the remote printing management database RD.

<Printer Registration Processing by General User>

Figure 6:
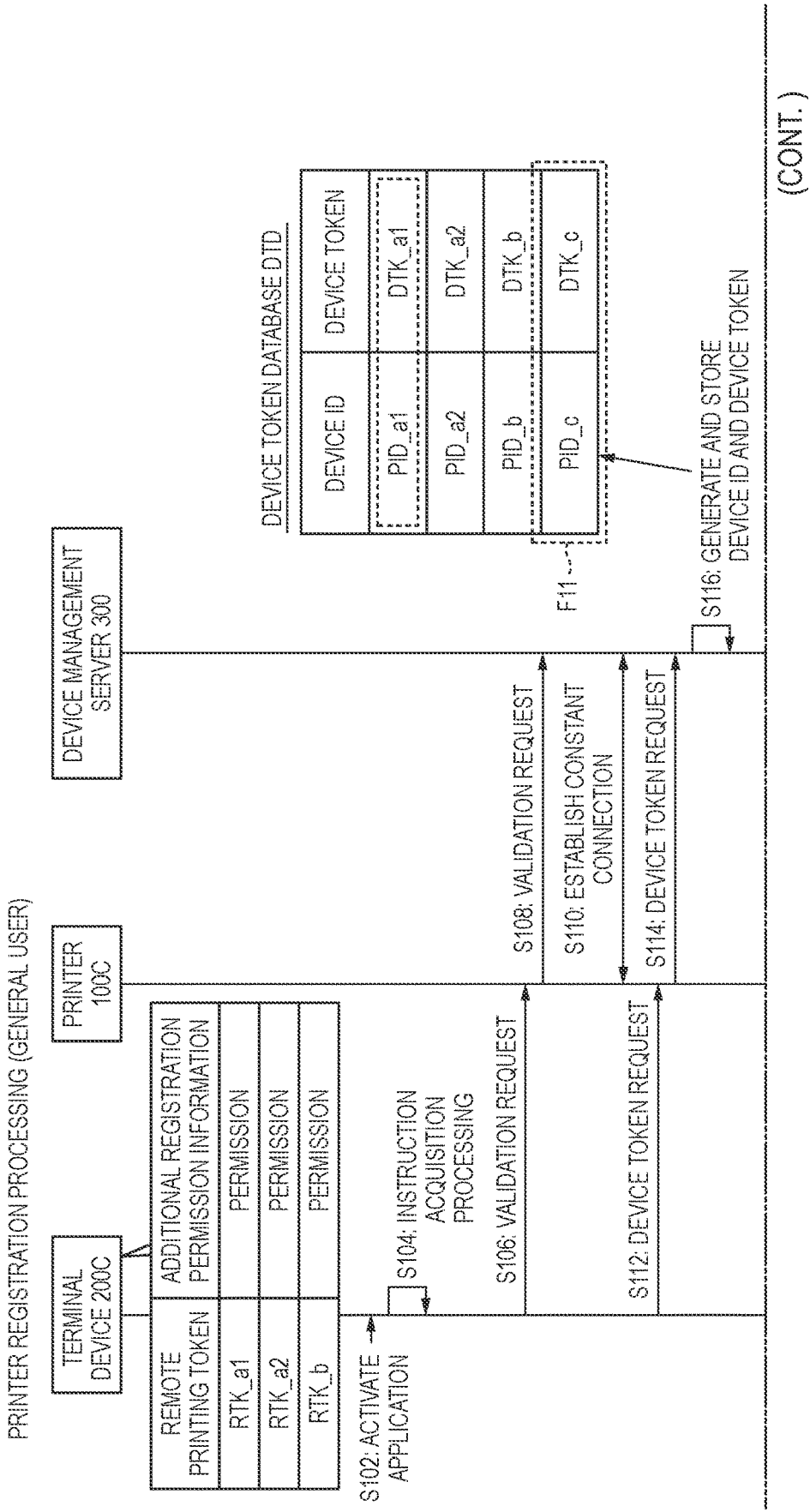
FIG. 6 is a first sequence diagram of printer registration processing performed by a general user.

Processing in which a general user registers a printer used for the consumable management service in the device management server 300 and the account management server 400 will be described. The registration processing by a general user can be performed by a general user who may use the remote printing service using a registered printer managed by an administrative user, using a terminal device in which a remote printing token is stored. FIGS. 6 and 7 are sequence diagrams of the printer registration processing performed by a general user. FIGS. 6 and 7 show a case where the general user C newly additionally registers the unregistered printer 100C installed in the site STc (for example, the home of the general user C) as a printer managed by the administrative user A. In the processing, a printer can be registered without bothering the administrative user A.

At a time point at which the processing in FIG. 6 is started, the printers 100A1, 100A2, and 100B are already registered in the servers 300 and 400 by the processing in FIGS. 4 and 5. Further, at this time point, the general user C may use the remote printing service using the printers 100A1, 100A2, and 100B. Therefore, as described above, at a time point at which the processing in FIG. 6 of the device management server 300 is started, the printers 100A1, 100A2, and 100B are already registered in the servers 300 and 400 by the processing in FIGS. 4 and 5. Further, at this time point, the general user C may use the remote printing service using the printers 100A1, 100A2, and 100B. Therefore, as described above, the account management database TBa of the account management server 400 is in the state shown in FIG. 2, and the device management database TBd of the device management server 300 is in the state shown in FIG. 3. As shown in FIG. 6, the remote printing tokens "RTK_a1", "RTK_a2", and "RTK_b" are stored in the memory of the terminal device 200C in association with the additional registration permission information.

In S102, the general user C activates the terminal application in the terminal device 200C. In S104, the activated terminal application of the terminal device 200C executes instruction acquisition processing. The instruction acquisition processing is processing of displaying a UI screen on the display of the terminal device 200C and acquiring various instructions from the user.

Figure 8:
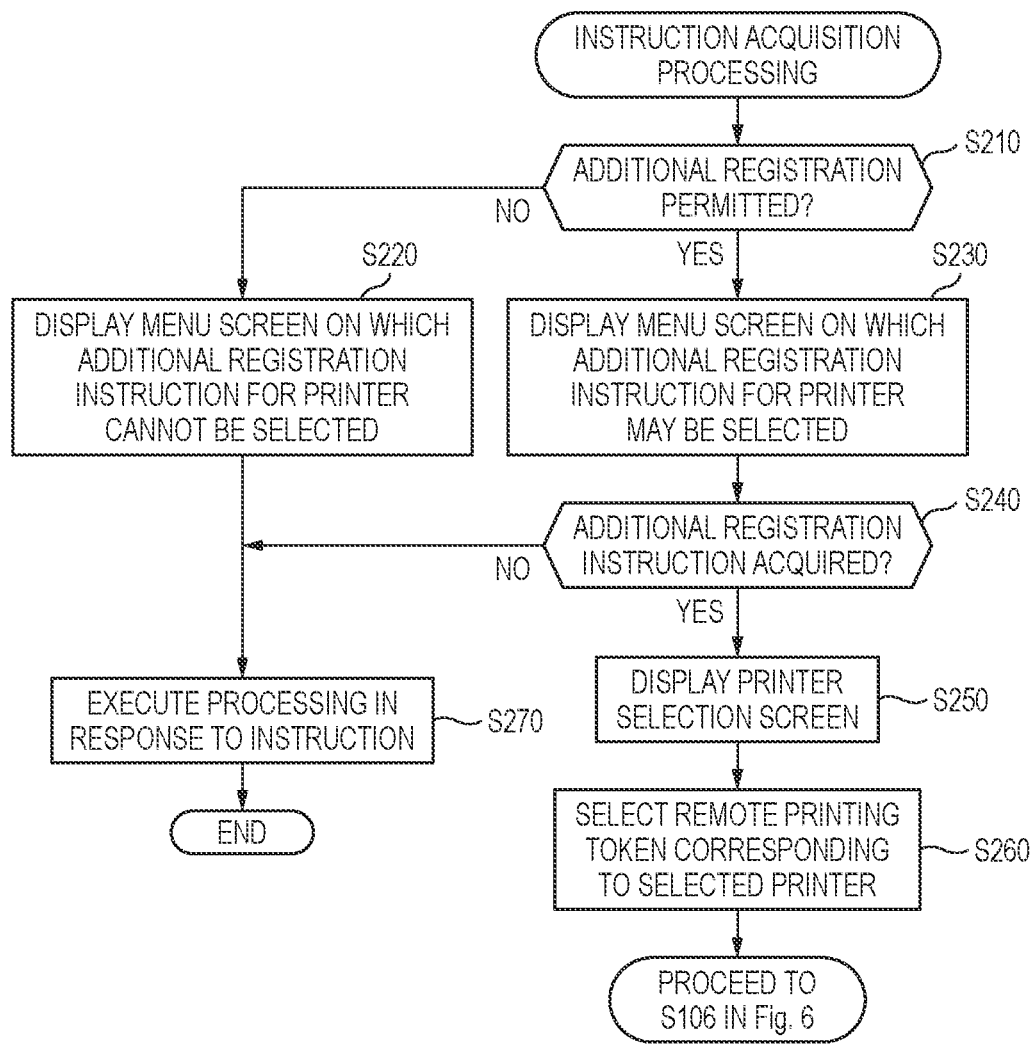
FIG. 8 is a flowchart of instruction acquisition processing.
Figure 9A:
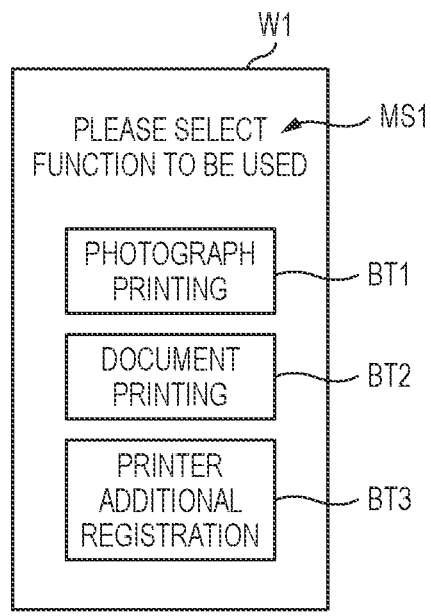
FIGS. 9A to 9C are diagrams showing an example of a UI screen.
Figure 9B:
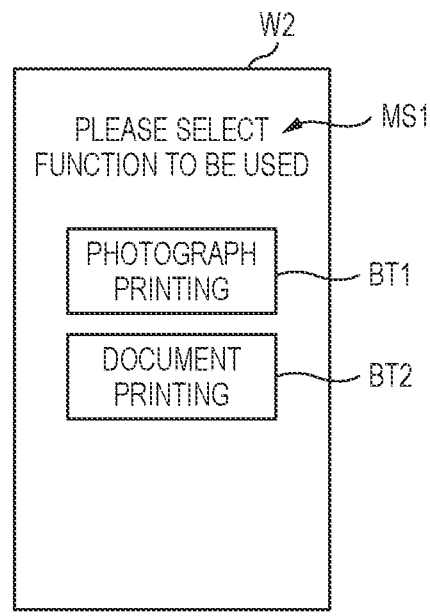
Figure 9C:
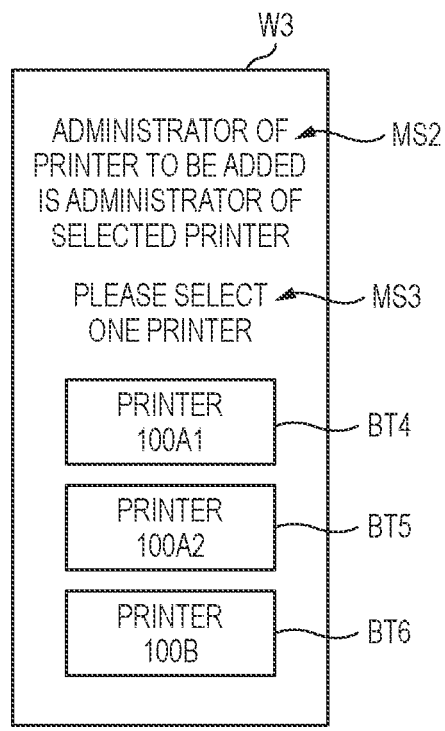

FIG. 8 is a flowchart of the instruction acquisition processing. FIGS. 9A to 9C are diagram showing an example of the UI screen. In S210, the terminal application of the terminal device 200C determines whether printer additional registration by the general user C is permitted. In a case where at least one piece of the additional registration permission information recorded in association with a remote printing token indicates "permission", the terminal application determines that additional registration is permitted. In a case where all of the additional registration permission information indicates "non-permission", the terminal application determines that the additional registration is not permitted. Since in the example of FIG. 6, all of the stored three pieces of additional registration permission information indicate "permission", it is determined that additional registration is permitted.

In a case where the additional registration is permitted (S210: YES), the terminal application displays, on the display, a menu screen W1 on which an additional registration instruction for a printer may be selected in S230. The menu screen W1 shown in FIG. 9A includes a message MS1 for prompting selection of a function to be used, and buttons BT1 to BT3 for inputting an instruction to select a function to be used. The buttons BT1, BT2, and BT3 are buttons for inputting a photograph printing instruction, a document printing instruction, and an additional registration instruction, respectively. A general user presses a button corresponding to a function to be executed among the buttons BT1, BT2, and BT3. In the example of FIG. 6, the general user C of the printer 100C presses the button BT3 for inputting an additional registration instruction. In a case where any one of the buttons BT1, BT2, and BT3 is pressed, the terminal application acquires an instruction to execute the function corresponding to the pressed button, and proceeds to S240.

In a case where the additional registration is not permitted (S210: NO), the terminal application displays, on the display, a menu screen W2 on which an additional registration instruction for a printer cannot be selected in S220. The menu screen W2 shown in FIG. 9B includes the message MS1 for prompting selection of a function to be used, and the buttons BT1 and BT2 for inputting an instruction to select a function to be used. The menu screen W2 does not include the button BT3 for inputting an additional registration instruction, and in this case, the general user cannot input an additional registration instruction. The general user presses a button corresponding to a function to be executed between the buttons BT1 and BT2. In a case where one of the buttons BT1 and BT2 is pressed, the terminal application acquires an instruction to execute the function corresponding to the pressed button, and proceeds to S270.

In S240, the terminal application determines whether an additional registration instruction is acquired. In a case where the additional registration instruction is acquired (S240: YES), the terminal application displays a printer selection screen W3 in S250. The printer selection screen W3 is a UI screen for acquiring, from a general user, a selection instruction to select one printer from one or more printers that can be used at the time of using the remote printing service. The printer selection screen W3 shown in FIG. 9C includes messages MS2 and MS3 and buttons BT4 to BT6.

The message MS2 is a message indicating that the administrative user of the printer to be newly added (printer 100C in the example of FIG. 6) is the administrative user of the printer selected from the registered printers 100A1, 100A2, and 100B. The message MS3 is a message that prompts selection of a printer. The buttons BT4 to BT6 are buttons for inputting selection instructions of the registered printers 100A1, 100A2, and 100B, respectively. The general user presses the button corresponding to the printer to be selected among the buttons BT4 to BT6. In a case where any one of the buttons BT4 to BT6 is pressed, the terminal application acquires the selection instruction of the printer corresponding to the pressed button, and proceeds to S260.

In S260, the terminal application selects the remote printing token corresponding to the printer selected by the selection instruction, and the processing proceeds to S106 in FIG. 6. In the example of FIG. 6, the printer 100A1 is selected by the selection instruction, and the remote printing token "RTK_a1" is selected. Although details will be described later, the selected remote printing token is transmitted to the device management server 300 in S122 of FIG. 6. As understood from the above description, it can be said that the selection instruction input by pressing any one of the buttons BT4 to BT6 is an instruction to select the remote printing token to be transmitted to the device management server 300 among the plurality of remote printing tokens stored in the terminal device 200C.

In S240, in a case where an instruction different from the additional registration instruction is acquired (S240: NO), the terminal application advances the processing to S270.

In S270, since an instruction different from the additional registration instruction is acquired at this time point, the terminal application executes processing in response to the instruction and ends the processing. Although details will be omitted, for example, the terminal application executes processing for printing a photograph or a document in response to the photograph print instruction or the document print instruction. In this case, the processing after S106 in FIG. 6 is not executed.

In S106 to S120 of FIG. 6, the same processing as the processing executed by the terminal device 200A, the printer 100A1, and the device management server 300 in S4 to S16 of FIG. 4 is executed by the terminal device 200C, the printer 100C, and the device management server 300.

In S106, the terminal application of the terminal device 200C transmits, to the printer 100C, a validation request for a service using the printer 100C in response to the printer addition instruction.

Upon receiving the validation request from the terminal device 200C, the printer 100C transmits the validation request to the device management server 300 in S108.

Upon receiving the validation request from the printer 100C, the device management server 300 establishes a constant connection with the printer 100C in S110. The constant connection is, for example, a connection according to Extensible Messaging and Presence Protocol (XMPP).

In S112, the terminal application of the terminal device 200C transmits a device token request to the printer 100C. Upon receiving the device token request, the printer 100C transmits the device token request to the device management server 300 in S114.

Upon receiving the device token request, the device management server 300 generates a device ID "PID_c" and a device token "DTK_c" to be assigned to the printer 100C, and stores the device ID "PID_c" and the device token "DTK_c" in the device token database DTD in S116. Accordingly, the device ID "PID_c" and the device token "DTK_c" are recorded in the device token database DTD in association with each other, as indicated by a broken-line frame F11 in FIG. 6.

In S118, the device management server 300 transmits the generated device token "DTK_c" to the printer 100C. Upon receiving the device token "DTK_c", the printer 100C stores the device token "DTK_c", and thereafter becomes accessible to the device management server 300 using the device token "DTK_c". In S120, the printer 100C transmits the received device token "DTK_c" to the terminal device 200C.

Upon receiving the device token "DTK_c", the terminal application of the terminal device 200C transmits a corresponding device ID request to the device management server 300 in S122. The corresponding device ID request includes the remote printing token "RTK_a1" selected in S260 of the instruction acquisition processing (S104 in FIG. 8). The corresponding device ID is a device ID associated with the remote printing token "RTK_a1". In other words, the corresponding device ID is the device ID of the printer 100A1 that executes printing in the remote printing service executed using the remote printing token "RTK_a1".

Upon receiving the corresponding device ID request, the device management server 300 specifies the corresponding device ID of the remote printing token "RTK_a1" included in the corresponding device ID request in S124. Specifically, the device management server 300 searches the remote printing management database RD in FIG. 3 to specify the device ID "PID_a1" associated with the remote printing token "RTK_a1" in the remote printing management database RD as the corresponding device ID. In S125, the device management server 300 transmits the specified corresponding device ID to the terminal device 200C.

Upon receiving the corresponding device ID, the terminal application of the terminal device 200C transmits a printer registration request to the account management server 400 in S126 of FIG. 7. The printer registration request includes the device token "DTK_c" received in S120 of FIG. 6 and the corresponding device ID "PID_a1" received in S125 of FIG. 6.

Upon receiving the printer registration request, the account management server 400 searches the contract database CD (FIG. 2) to specify the contract ID "CT_a" that is associated with the corresponding device ID "PID_a" included in the printer registration request in S127.

In S128, the account management server 400 searches the account database AD to specify the administrator ID "MID_a" associated with the contract ID "CT_a" specified in S127.

In S130, the account management server 400 transmits a printer registration request to the device management server 300. The printer registration request includes the administrator ID "MID_a" specified in S128 and the device token "DTK_c" received in S126.

Upon receiving the printer registration request, the device management server 300 registers the printer 100C in the device database DD. Specifically, the device management server 300 searches the device token database DTD to specify the device ID "PID_c" (device ID of printer 100C) that is associated with the device token "DTK_c" included in the printer registration request. The device management server 300 records the specified device ID "PID_a1" in the device database DD in association with the administrator ID "MID_a" included in the printer registration request. Accordingly, the device ID "PID_c" of the printer 100C and the administrator ID "MID_a" associated with the account of the administrative user A are recorded in the device database DD in association with each other, as indicated by a broken-line frame F12 in FIG. 7.

In S134, the device management server 300 transmits a registration completion notification to the account management server 400. The registration completion notification includes the device ID "PID_c" of the registered printer 100C (device ID newly recorded in the device database DD).

Upon receiving the registration completion notification, the account management server 400 records the device ID "PID_c" included in the registration completion notification and the contract information in the contract database CD in S136. Specifically, the account management server 400 searches the contract database CD to specify the contract plan "plan 1" associated with the contract ID "CT_a" specified in S127. The account management server 400 records the contract ID "CT_a" specified in S127, the specified contract plan "plan 1", and the device ID "PID_c" included in the registration completion notification in association with one another in the contract database CD, as indicated by the broken-line frame F13 in FIG. 7.

Through the above processing, the printer 100C is registered as the printer of the administrative user A to be newly used for the service. Thereafter, for example, in a case where the administrative user A transmits information on the address of the transmission destination of the consumable (for example, the address of the site STc where the printer 100C is installed) to the account management server 400 using the terminal application of the terminal device 200A, the information on the address is recorded in the remote printing management database RD in association with the device ID "PID_c". Accordingly, the consumable management service may be started for the printer 100C.

According to the present embodiment described above, the servers 300 and 400 store administrator IDs, which are information on a plurality of administrators (for example, administrative users A and B) of the remote printing service provided by using the registered printers 100A1, 100A2, and 100B, and a plurality of remote printing tokens, which are authority information for using the remote printing service, in association with each other. For example, in the present embodiment, as described above, the device ID which is the printer information and the remote printing token are recorded in the remote printing management database RD (FIG. 3) stored in the device management server 300 in association with each other. The device ID and the contract ID which is information on a contract of the consumable management service are stored in the contract database CD (FIG. 2) stored in the account management server 400 in association with each other. The administrator ID and the contract ID are stored in the account database AD (FIG. 2) stored in the account management server 400 in association with each other. In this way, it is understood that the administrator ID and the remote printing token are indirectly associated with each other via the device ID and the contract ID in the three databases RD, CD, and AD.

The servers 300 and 400 receive the device token "DTK_c" and the remote printing token "RTK_a1", which are information on the unregistered printer 100C, from the terminal device 200C of the general user C who is the user of the remote printing service (S122 in FIGS. 6 and S126 in FIG. 7). The device management server 300 registers the administrator ID "MID_a", which is associated with the remote printing token "RTK_a1" received from the terminal device 200C, and the information on the printer 100C (device ID "PID_c" and device token "DTK_c") in association with each other (S116 in FIGS. 6 and S132 in FIG. 7). As a result, the servers 300 and 400 receive the remote printing token "RTK_a1" and the device token "DTK_c" that is the information on the printer 100C from the terminal device 200C of the user of the remote printing service, thereby recording the information on the printer 100C (device token "DTK_c" and device ID "PID_c") in association with the administrator ID "MID_a" of the administrative user A. That is, the printer 100C can be newly registered in association with the administrative user A. Therefore, the burden on the administrative user A for registering the printer 100C can be reduced.

For example, in a case where the administrative user A temporarily executes processing of newly additionally registering the printer 100C installed in the site STc, the administrative user A moves to the site STc with the terminal device 200A, and communicably connects the terminal device 200A and the printer 100C via the local area network of the site STc. Then, the administrative user A executes the printer registration processing described with reference to FIG. 4 using the terminal device 200A. In this case, for example, in a case where the site STc is the home of the general user C, the burden on the administrative user A may be large. On the other hand, in the present embodiment, when the general user C is in a state of being able to use the remote printing service using the registered printer (for example, the printer 100A1) managed by the administrative user A, in other words, when the remote printing token (for example, "RTK_a1") associated with the registered printer is stored in the terminal device 200C of the general user C, the general user C can additionally register the printer 100C using the terminal device 200C. The administrative user A does not need to inform the general user C of his/her account information (account ID or password). In this way, according to the present embodiment, the burden on the administrative user A for registering the printer 100C can be reduced. For example, in order to perform teleworking at the site STc, the general user C can easily register the own printer 100C as a printer managed by the administrative user A.

Specifically, the device management server 300 searches the database RD to specify the device ID "PID_a1" (corresponding device ID "PID_a1"), which is information on the printer 100A1 that is associated with the remote printing token "RTK_a1" received from the terminal device 200A (S124 in FIG. 6). The account management server 400 searches the contract database CD to specify the contract ID "CT_a" which is information on the consumable management service associated with the specified corresponding device ID "PID_a1" (S127 in FIG. 7). The account management server 400 searches the account database AD to specify the administrator ID "MID_a" which is information on the administrative user A associated with the specified contract ID "CT_a" (S128 in FIG. 7). Then, the device management server 300 registers the specified administrator ID "MID_a" of the administrative user A in association with the device ID "PID_c" and the device token "DTK_c", which are information on the printer 100C (S132 in FIGS. 7 and S116 in FIG. 6). For example, the administrator ID "MID_a" and the device ID "PID_c" are directly associated with each other in the device database DD, as indicated by the broken-line frame F12 in FIG. 7. In addition, the administrator ID "MID_a" and the device token "DTK_c" are indirectly associated with each other via the device ID "PID_c" in the device token database DTD and the device database DD, as indicated by the broken-line frames F11 and F12 in FIGS. 6 and 7.

Further, according to the present embodiment, the account management server 400 registers the administrator ID "MID_a" and the account information, which are the information on the administrative user A, and the information on the consumable management service provided by using the newly additionally registered printer 100C in association with each other. Specifically, the account management server 400 records the contract ID "CT_a" and the contract plan "plan 1", which are information on the consumable management service, in the contract database CD in association with the device ID "PID_c" of the printer 100C, as indicated by the broken-line frame F13 in FIG. 7. The account management server 400 previously records the contract ID "CT_a", which is the information on the consumable management service, and the administrator ID "MID_a" and the account information, which are the information on the administrative user, in the account database AD in association with each other (FIG. 2). Accordingly, the device ID "PID_c" of the printer 100C, the contract plan "plan 1", and the contract ID "CT_a" are associated with the administrator ID "MID_a" and the account information of the administrative user A.

As a result, the general user C can register the printer 100C as the printer to be subjected to the consumable management service using the terminal device 200C. Therefore, for example, in order to register the printer 100C as the printer to be subjected to the consumable management service, the administrative user A does not need to perform, using the terminal device 200A, processing of associating the device ID "PID_c" of the printer 100C and the contract plan "plan 1" with the contract ID "CT_a". Therefore, the burden on the administrative user A can be reduced.

Furthermore, according to the present embodiment, the device management server 300 stores the additional registration permission information indicating whether addition of a new printer using a remote printing token in a form of being recorded in the remote printing management database RD is permitted. The device management server 300 registers the information on the printer 100C in a case where the additional registration permission information is "permission" indicating that addition of a new printer is permitted, and does not register the information in a case where the additional registration permission information is "non-permission" indicating that addition of a new printer is not permitted.

Specifically, in the present embodiment, the device management server 300 transmits the additional registration permission information acquired from the administrative user A to the terminal device 200C together with the remote printing token (S82 in FIG. 5). Then, as shown in FIG. 8, the terminal application of the terminal device 200C displays the menu screen W1 (FIG. 9A) on which an additional registration instruction may be selected in a case where the additional registration is permitted based on the additional registration permission information (S210 in FIG. 8: YES). The terminal application of the terminal device 200C displays the menu screen W2 (FIG. 9B) on which the additional registration instruction cannot be selected in a case where the additional registration is not permitted based on the additional registration permission information (S210 in FIG. 8: NO). In this way, in the present embodiment, the printer registration processing in FIGS. 6 and 7 is executed only in a case where the additional registration is permitted. As a result, for example, it is possible to prevent the general user C from additionally registering a new printer against the intention of the administrative user A. The administrative user A can transmit the registration addition information indicating "permission" or "non-permission" to the device management server 300, thereby easily controlling whether to permit the general user C to add a new printer.

Furthermore, in a case where a plurality of remote printing tokens are stored in the terminal device 200C, the device management server 300 receives the remote printing token selected by the general user C from among the plurality of remote printing tokens (S104 and S122 in FIG. 6, and S250 and S260 in FIG. 8). As a result, in a case where a plurality of remote printing tokens that may be used are stored in the terminal device 200C, it is possible to additionally register the printer 100C using the printing token according to the intention of the general user C.

More specifically, in the example of FIG. 6, three remote printing tokens "RTK_a1", "RTK_a2", and "RTK_c" are stored in the terminal device 200C. It can be said that the remote printing tokens "RTK_a1" and "RTK_a2" are associated with the device IDs of the printers 100A1 and 100A2 managed by the administrative user A, and the remote printing tokens "RTK_a1" and "RTK_a2" are associated with the administrative user A. It can be said that since the remote printing token "RTK_b" is associated with the device ID of the printer 100B managed by the administrative user A, the remote printing token "RTK_b" is associated with the administrative user B. In the present embodiment, the device management server 300 specifies the administrator ID associated with the received remote printing token (S124 in FIGS. 6 and S127 and S128 in FIG. 7), and registers the specified administrator ID and the information on the printer 100C in association with each other (S132 in FIG. 7). Therefore, in a case where the remote printing token "RTK_a1" or "RTK_a2" is received in S122 in FIG. 6, the device management server 300 registers the administrator ID "MID_a" of the administrative user A and the information on the printer 100C in association with each other. In a case where the remote printing token "RTK_b" is received in S122 in FIG. 6, the device management server 300 registers the administrator ID "MID_b" of the administrative user B and the information on the printer 100C in association with each other. In this way, in the present embodiment, an appropriate administrator ID corresponding to the intention of the general user C and the printer 100C can be registered in association with each other. For example, in a case where it is desired to register the printer 100C as the printer managed by the administrative user A, the general user C may select one of the printers 100A1 and 100A2 managed by the administrative user A on the printer selection screen W3. In a case where it is desired to register the printer 100C as the printer managed by the administrative user B, the general user C may select the printer 100B managed by the administrative user B on the printer selection screen W3.

Furthermore, according to the above-described embodiment, the remote printing token "RTK_a1" is information associated with the printer 100A1 used for providing the remote printing service, as shown in the remote printing management database RD in FIG. 3. As described above, the remote printing token "RTK_a1" is information indicating the authority to cause the printer 100A1 to execute the printing processing in the remote printing service. The information (contract ID "CT_a" and contract plan "plan 1") recorded in the contract database CD is information associated with the printer 100C used for providing the consumable management service, and is information on a contract related to the provision of the consumable management service (FIG. 2). In this way, in the present embodiment, only by receiving the remote printing token "RTK_a1" associated with the registered printer 100A1 and the information on the printer 100C to be newly registered from the terminal device 200C of the general user C who is the user of the remote printing service, the information on the administrative user A and the information on the contract related to the provision of the consumable management service using the printer 100C can be registered in association with each other.

Furthermore, according to the above-described embodiment, the remote printing service is a service in which the device management server 300 executes processing related to the printer 100A1 associated with the remote printing token "RTK_a1" in a case where data (for example, an image file or a printing instruction) including the remote printing token "RTK_a1" is received from the terminal device 200C. That is, in the remote printing service, it is necessary to transmit data from the terminal device 200C to the device management server 300. The consumable management service is a service of executing processing of managing a consumable of a printer without relation to reception of data from the terminal device 200C. That is, in the consumable management service, it is not necessary to transmit any data from the terminal device 200C to the device management server 300. In this way, in the remote printing service, it is necessary to store the remote printing token "RTK_a1" for transmitting data to the terminal device 200C, but in the consumable management service, it is not necessary to store a token in the terminal device 200C. In the present embodiment, the information on the consumable management service, which is a service different from the remote printing service, can be registered in the servers 300 and 400 using the remote printing token "RTK_a1" used for the remote printing service.

More specifically, the remote printing service is a service in which the device management server 300 transmits a print job to the printer 100A1 in a case where a print instruction including the remote printing token "RTK_a1" is received from the terminal device 200C, thereby causing the printer 100A1 to execute printing. The consumable management service is a service in which the server receives information on a consumable (for example, ink) from the printer 100C and executes processing (for example, processing for delivering the ink to the general user C) in accordance with consumption of the consumable in the printer 100C. In this way, in the present embodiment, the remote printing token "RTK_a1" stored in the terminal device 200C for causing the printer 100A1 to execute printing can be used to register the information on the administrative user A and the information on the service for executing the processing in accordance with the consumption of the consumable in another printer 100C in association with each other. In this way, since a token for one service can be used to register information for another service without using the terminal device 200A of the administrative user A, the burden on the administrative user A can be effectively reduced.

Modified Examples

Figure 10:
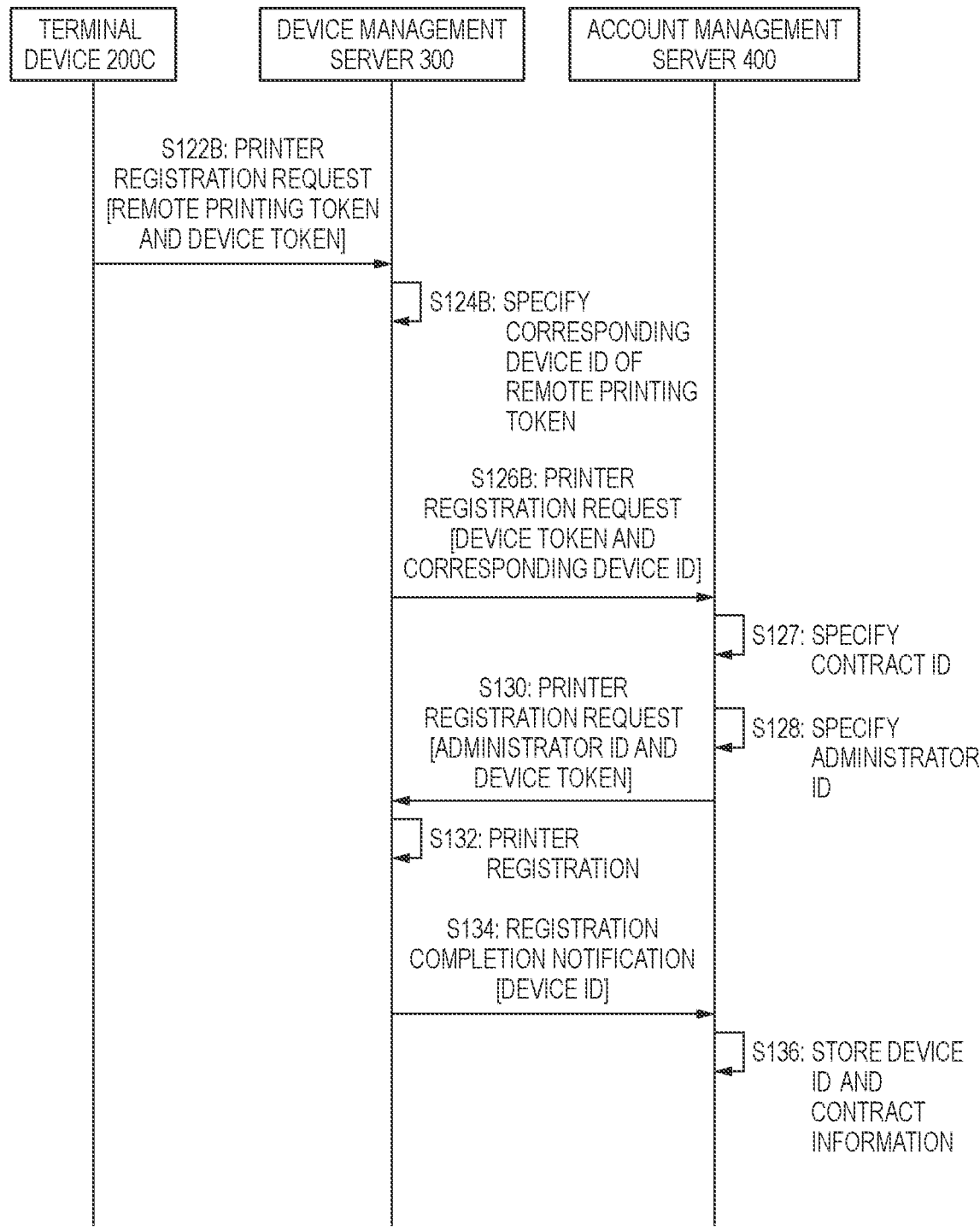
FIG. 10 is a sequence diagram of printer registration processing according to a modified example.

The printer registration processing (FIGS. 6 and 7) performed by the general user C according to the above-described embodiment is an example, and various modified examples are possible without being limited thereto. FIG. 10 is a sequence diagram of printer registration processing according to a modified example.

In the printer registration processing according to the modified example, after execution of the processing of S102 to S120 in FIG. 6, the processing of S122B to S126B in FIG. 10 is executed instead of S122 to S125 in FIGS. 6 and S126 in FIG. 7.

In S122B, the terminal application of the terminal device 200C transmits a printer registration request to the device management server 300. The printer registration request includes the remote printing token "RTK_a1" selected in S260 of the instruction acquisition processing (S104 in FIG. 8) and the device token "DTK_c" received in S120 of FIG. 6.

Upon receiving the printer registration request, the device management server 300 specifies a corresponding device ID of the remote printing token "RTK_a1" included in the printer registration request in S124B. A method for specifying the corresponding device ID is the same as that of S124 in FIG. 6, the remote printing management database RD in FIG. 3 is searched, and the device ID "PID_a1" associated with the remote printing token "RTK_a1" in the remote printing management database RD is specified as the corresponding device ID.

In S126B, the device management server 300 transmits the printer registration request to the account management server 400. The printer registration request transmitted in S126B includes the device token "DTK_c" included in the printer registration request received in S122B and the corresponding device ID "PID_a1" specified in S124B. The processing of S127 to S136 executed after S126B is the same as S127 to S136 in FIG. 7.

According to the printer registration processing according to the modified example described above, the general user C can newly register the printer 100C in the servers 300 and 400 using the terminal device 200C, similarly to the printer registration processing in FIGS. 6 and 7 according to the embodiment.

Figure 11:
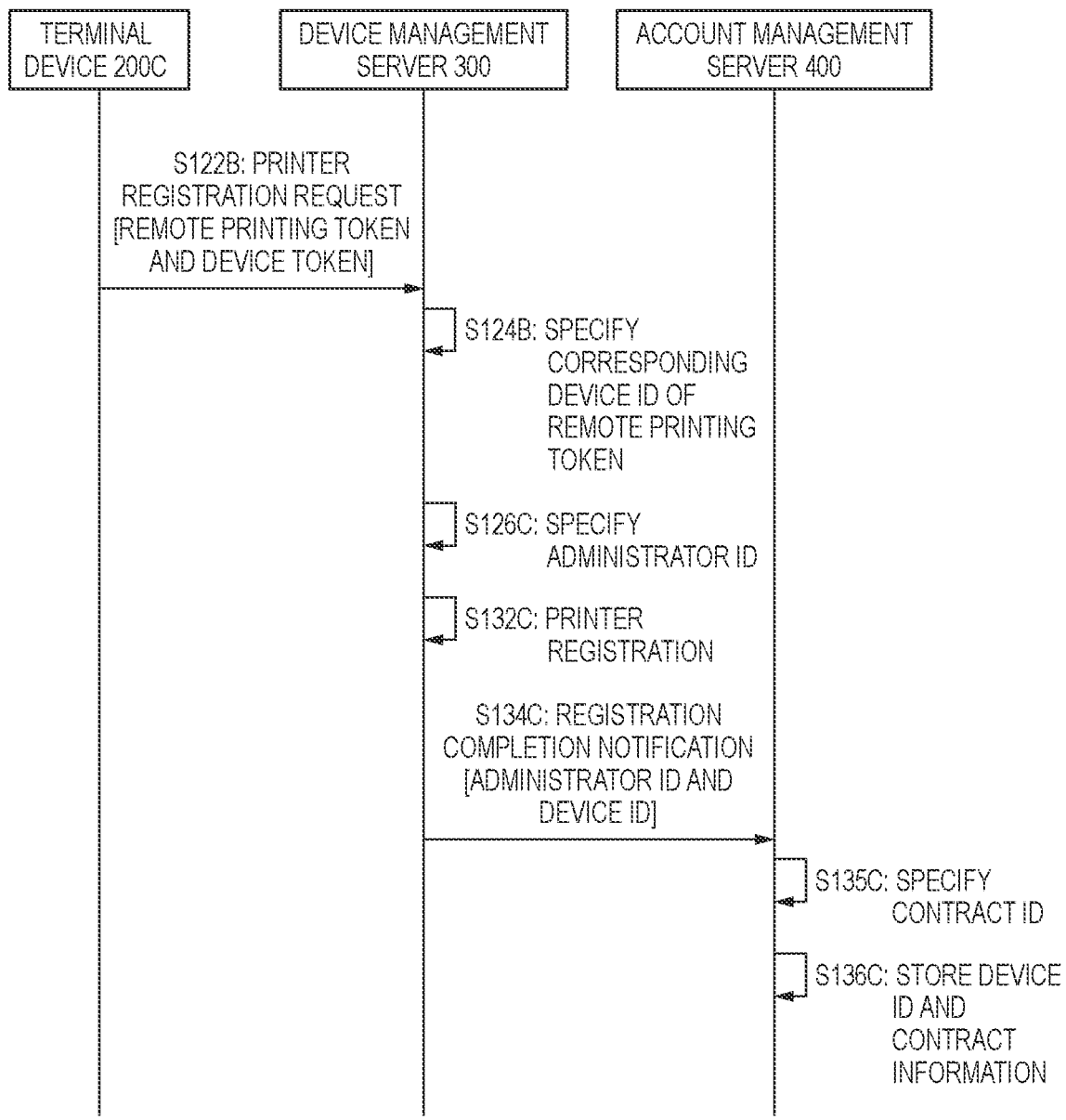
FIG. 11 is a sequence diagram of printer registration processing according to another modified example.

FIG. 11 is a sequence diagram of printer registration processing according to another modified example. In the printer registration processing according to another modified example, after execution of the processing of S102 to S120 in FIG. 6, S122B, S124B, and S126C to S136C in FIG. 11 are executed instead of S122 to S136 in FIG. 6. The processing of S122B and S124B in FIG. 11 is the same as the processing of S122B and S124B in FIG. 10.

In S126C, the device management server 300 searches the device database DD to specify the administrator ID "MID_a" associated with the corresponding device ID "PID_a1".

In S132C, the device management server 300 registers the printer 100C in the device database DD. Specifically, the device management server 300 searches the device token database DTD to specify the device ID "PID_c" (device ID of printer 100C) that is associated with the device token "DTK_c" included in the printer registration request received in S122B. The device management server 300 records the specified device ID "PID_c" in the device database DD in association with the administrator ID "MID_a" specified in S126C. Accordingly, the device ID "PID_c" of the printer 100C and the administrator ID "MID_a" associated with the account of the administrative user A are recorded in the device database DD in association with each other, as indicated by a broken-line frame F12 in FIG. 7.

In S134C, the device management server 300 transmits a registration completion notification to the account management server 400. The registration completion notification includes the device ID "PID_c" of the registered printer 100C and the administrator ID "MID_a" associated with the device ID "PID_c".

Upon receiving the registration completion notification, the account management server 400 records the device ID "PID_c" included in the registration completion notification and contract information in the contract database CD in S136C. Specifically, the account management server 400 searches the account database AD to specify the contract ID "CT_a" associated with the administrator ID "MID_a" included in the registration completion notification. The account management server 400 searches the contract database CD to specify the contract plan "plan 1" associated with the specified contract ID "CT_a". The account management server 400 records the specified contract ID "CT_a", the specified contract plan "plan 1", and the device ID "PID_c" included in the registration completion notification in the contract database CD in association with one another, as indicated by the broken-line frame F13 in FIG. 7.

According to another modified example described above, the device management server 300 searches the remote printing management database RD to specify the device ID "PID_a1" that is associated with the remote printing token "RTK_a1" received from the terminal device 200C (S124B in FIG. 11), searches the device database DD to specify the information on the administrator ID "MID_a" associated with the specified device ID "PID_a1" (S126C in FIG. 11), and registers the specified administrator ID "MID_a" in the device database DD in association with the device ID "PID_c" of the printer 100C (S132C in FIG. 11).

According to another modified example, the device management server 300 specifies the administrator ID "MID_a" executed by the account management server 400 in the embodiment (S128 in FIG. 7) (S126C in FIG. 11). Even in this case, since as in the embodiment, the administrator ID "MID_a" and the device ID "PID_c" of the printer 100C can be appropriately associated and registered in the device database DD, the general user C can newly register the printer 100C in the servers 300 and 400 using the terminal device 200C.

In the above-described embodiment, the information (contract ID and contract plan) relating to the contract in the contract database CD is registered in association with the device ID "PID_c" of the new printer 100C in the printer registration processing by the general user C in FIGS. 6 and 7 (S136 in FIG. 7). Alternatively, S136 in FIG. 7 may be omitted, and only registration of the device ID "PID_c" and the device token "DTK_c" in the device token database DTD (S116 in FIG. 6) and registration of the device ID "PID_c" and the administrator ID "MID_a" in the device database DD (S132 in FIG. 7) may be performed for the new printer 100C. In this case, the registration of the information related to the contract in the contract database CD may be performed by the administrative user A using the terminal device 200A.

The specific configuration of the account management database TBa in FIG. 2 according to the above-described embodiment is an example, and may be appropriately changed. For example, in the account management database TBa in FIG. 2, the administrator ID is associated with the contract ID in the account database AD, and the contract ID is associated with the contract plan, the device ID, and the information on the transmission destination in the contract database CD. Accordingly, the administrator ID is associated with the contract plan, the device ID, and the information on the transmission destination via the contract ID. Alternatively, the administrator ID may be directly associated with the contract plan, the device ID, and the information on the transmission destination in the contract database CD without using the contract ID.

The specific configuration of the device management database TBd in FIG. 3 according to the above-described embodiment is an example, and may be appropriately changed. For example, the device database DD and the device token database DTD are separate databases in the device management database TBd in FIG. 3, but for example, the device database DD and the device token database DTD may be one database in which a device ID and a device token are associated with an administrator ID. In the above-described embodiment, the additional registration permission information is associated with each remote printing token in the remote printing management database RD. Alternatively, the additional registration permission information may be set for each administrative user, and for example, may be recorded in the device database DD in association with the administrator ID.

The UI screen in FIG. 8 and the instruction acquisition processing in FIG. 7 according to the above-described embodiment are examples, and may be appropriately changed. For example, in the embodiment, the menu screen W1 for selecting a function to be used is displayed first, and the printer selection screen W3 is displayed in a case where an additional registration instruction is input on the menu screen W1. Alternatively, a printer selection screen may be displayed first, and after one printer is selected, a menu screen for selecting a function to be used using the printer may be displayed. In addition, for example, even when a plurality of remote printing tokens are stored in the terminal device 200C, in a case where the administrator of the printers associated with the plurality of remote printing tokens is the same, the display on the printer selection screen W3 may be omitted, and the terminal device 200C may transmit any one of the plurality of remote printing tokens to the device management server 300.

The additional registration permission information according to the above-described embodiment may not be used. In this case, registration of a new printer by the general user C may be normally permitted.

In the above-described embodiment, the devices to be registered are all printers, but are not limited thereto. For example, devices managed by an administrative user may include a scanner and a printer. For example, it is assumed that the servers 300 and 400 provide a service in which the administrative user C remotely operates a registered scanner managed by the administrative user A using the terminal device 200C, and a remote operation token associated with the scanner for the service is stored in the terminal device 200C. In this case, the printer registration processing in FIGS. 6 and 7 may be executed in order to register a new printer in the servers 300 and 400 using a remote operation token of a scanner instead of the remote printing token according to the embodiment. The device operated using a remote operation token is not limited to a scanner, and may be another device, for example, an electric appliance such as a monitoring camera or an air conditioner.

The device to be additionally registered is not limited to a printer, and may be another device. For example, the newly additionally registered device may be various devices that consume a consumable, for example, a water server that supplies water and various devices operated by consuming fuel.

In the above-described embodiment, the two servers 300 and 400 cooperate with each other to execute the processing in FIGS. 4 to 7 including communication with each terminal device and each printer. Alternatively, the processing performed by the two servers 300 and 400 may be performed by one server or may be performed by three or more servers.

In the above-described embodiment, a part of the configuration implemented by hardware may be replaced with software, and conversely, a part or all of the configuration implemented by software may be replaced with hardware.

Although the present disclosure has been described based on the embodiment and the modified examples, the above-described embodiment of the present disclosure are intended to facilitate the understanding of the present disclosure and are not intended to limit the present disclosure. The present disclosure may be modified or improved without departing from the gist and scope of the claims, and includes equivalents thereof

What is claimed is:

1. A server comprising:
   a storage device configured to store information on a plurality of administrators for a first service provided using respective registered devices, a plurality of tokens, respectively, and general permission information indicating whether adding a new device to provide the first service is permitted or not, in association with each other, the plurality of tokens is used as pieces of authority information for using the first service;
   a receiving device configured to receive, from a terminal device in which a specific token, used as specific authority information among the plurality of tokens used as the pieces of authority information and the general permission information are stored, information on an unregistered specific device and the specific token, used as the specific authority information; and
   a registering device configured to register, based on the general permission information stored in the storage device, information on a specific administrator that is associated with the specific token, used as the specific authority information received from the terminal device among the information on the plurality of administrators stored in the storage device without inquiring from the specific administrator for specific permission for the registering.

2. The server according to claim 1, wherein
   the registering device is configured to register the information on the specific administrator and information on a second service provided by using the unregistered specific device in association with each other.

3. The server according to claim 2, wherein
the storage device is configured to store a first database in which information on the respective registered devices used for providing the first service and the plurality of tokens used as the pieces of authority information are recorded in association with each other, respectively, a second database in which the information on the respective registered devices and the information on the second service are recorded in association with each other, respectively, and a third database in which the information on the plurality of administrators and the information on the second service are recorded in association with each other, and
the registering device is configured to
   search the first database to specify information on a respective registered device that is associated with the specific token, used as the specific authority information received from the terminal device,
   search the second database to specify information on the second service associated with the specified information on the registered device,
   search the third database to specify information on an administrator associated with the specified information on the second service, and
   register the specified information on the administrator as the information on the specific administrator in association with the information on the unregistered specific device.

4. The server according to claim 3, wherein
the registering device is configured to register the information on the specific administrator and the information on the second service provided using the unregistered specific device in association with each other by recording the information on the specific administrator and the information on the second service in the third database in association with each other and recording the information on the unregistered specific device and the information on the second service in the second database in association with each other.

5. The server according to claim 1, wherein
the registering device is configured to
   register the information on the specific administrator and the information on the unregistered specific device in association with each other in a case where the general permission information indicates that adding of the new device is permitted, and
   not register the information on the specific administrator and the information on the unregistered specific device in association with each other in a case where the general permission information indicates that adding of the new device is not permitted.

6. The server according to claim 1, wherein
the terminal device is configured to store a plurality of specific tokens, used as pieces of specific authority information, and
the receiving device is configured to receive a token, used as a piece of authority information selected by a user of the terminal device among the plurality of tokens used as the pieces of authority information.

7. The server according to claim 6, wherein
the plurality of specific tokens, used as the pieces of the specific authority information include first authority information and second authority information,
the specific administrator includes a first administrator associated with the first authority information and a second administrator associated with the second authority information,
the registering device is configured to register information on the first administrator and the information on the unregistered specific device in association with each other in a case where the first authority information is received by the receiving device, and
the registering device is configured to register information on the second administrator and the information on the unregistered specific device in association with each other in a case where the second authority information is received by the receiving device.

8. The server according to claim 3, wherein
a plurality of specific tokens used as the pieces of the specific authority information are used as information, that is associated with the respective registered devices used for providing the first service, indicating authority to execute processing related to the first service, and
the information on the second service is information, that is associated with a respective registered device used for providing the second service on a contract related to provision of the second service.

9. The server according to claim 3, wherein
the first service is a service in which the server executes processing related to the respective registered device associated with the specific token, used as the specific authority information in a case where data including the specific token, used as the specific authority information is received from the terminal device, and
the second service is a service in which the server executes processing related to the respective registered device without relation to reception of data from the terminal device.

10. The server according to claim 9, wherein
each of the respective registered devices and the unregistered specific device is a printer,
the first service is a service in which the server transmits a print job to the printer associated with the specific token, used as the specific authority information in a case where a print instruction including the specific token, used as the specific authority information is received from the terminal device, thereby causing the printer to execute printing, and
the second service is a service in which the server receives, from the printer, information on a consumable of the printer and executes processing corresponding to consumption of the consumable in the printer.

11. The server according to claim 3, wherein
the storage device is configured to store a first database in which information on the respective registered devices used for providing the first service and the plurality of tokens, respectively, used as the pieces of authority information are recorded in association with each other, and a fourth database in which the information on the plurality of the administrators and the information on the respective registered devices are recorded in association with each other, and
the registering device is configured to
   search the first database to specify information on the respective registered device that is associated with the specific token, used as the specific authority information received from the terminal device,
   search the fourth database to specify information on an administrator associated with the specified information on the respective registered device, and register the specified information on the administrator as the information on the specific administrator in association with the information on the unregistered specific device.

12. A non-transitory computer-readable storage medium storing a computer program, the computer program for a device including a storage device configured to store information on a plurality of administrators for a first service provided using respective registered devices a plurality of tokens, respectively, and general permission information indicating whether adding a new device to provide the first service is permitted or not, in association with each other, the plurality of tokens is used as pieces of authority information for using the first service, when excused by a computer of a server, causing the server to perform:

receiving, from a terminal device in which a specific token, used as specific authority information among the plurality of tokens used as the pieces of authority information and the general permission information are stored, information on an unregistered specific device and the specific token, used as the specific authority information; and registering, based on the general permission information stored in the storage device, information on a specific administrator that is associated with the specific token, used as the specific authority information received from the terminal device among the information on the plurality of administrators stored in the storage device and information on the unregistered specific device in association with each other without inquiring from the specific administrator for specific permission for the registering.

* * * * *